United States Patent
Lo et al.

(10) Patent No.: US 11,668,641 B2
(45) Date of Patent: Jun. 6, 2023

(54) IMAGE-BASED CELL SORTING SYSTEMS AND METHODS

(71) Applicant: The Regents of the University of California, Oakland, CA (US)

(72) Inventors: Yu-Hwa Lo, San Diego, CA (US); Yuanyuan Han, San Diego, CA (US); Yi Gu, San Diego, CA (US); Ce Zhang, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/326,312

(22) Filed: May 20, 2021

(65) Prior Publication Data

US 2022/0011216 A1 Jan. 13, 2022

Related U.S. Application Data

(63) Continuation of application No. 16/307,449, filed as application No. PCT/US2017/036864 on Jun. 9, 2017, now Pat. No. 11,016,017.

(Continued)

(51) Int. Cl.
*G06K 9/00* (2022.01)
*G01N 15/14* (2006.01)
(Continued)

(52) U.S. Cl.
CPC ........ *G01N 15/1475* (2013.01); *G01J 3/0208* (2013.01); *G01J 3/0229* (2013.01);
(Continued)

(58) Field of Classification Search
None
See application file for complete search history.

(56) References Cited

U.S. PATENT DOCUMENTS 8,820,538 B1 9/2014 Lin
8,824,768 B1 9/2014 Simon
(Continued)

FOREIGN PATENT DOCUMENTS

CN 102250825 A 11/2011
CN 103674814 A 3/2014
(Continued)

OTHER PUBLICATIONS

CNIPA, First Office Action for Chinese Patent Application No. 201780046504.9. dated Mar. 15, 2021. 18 pages with English translation.
(Continued)

*Primary Examiner* — Atiba O Fitzpatrick
(74) *Attorney, Agent, or Firm* — Perkins Coie LLP

(57) ABSTRACT

Disclosed are systems, devices and methods for imaging and image-based sorting of particles in a flow system, including cells in a flow cytometer. In some aspects, a system includes a particle flow device to flow particles through a channel, an imaging system to obtain image data of a particle during flow through the channel, a processing unit to determine a property associated with the particle and to produce a control command for sorting the particle based on sorting criteria associated with particle properties, and an actuator to direct the particle into one of a plurality of output paths of the particle flow device in real-time.

18 Claims, 25 Drawing Sheets

Related U.S. Application Data

(60) Provisional application No. 62/348,511, filed on Jun. 10, 2016.

(51) Int. Cl.
  *G01J 3/51* (2006.01)
  *G01J 3/02* (2006.01)
  *G01J 3/36* (2006.01)
  *G01J 3/46* (2006.01)
  *G01J 3/44* (2006.01)
  *G01N 15/10* (2006.01)

(52) U.S. Cl.
  CPC ............... *G01J 3/36* (2013.01); *G01J 3/4406* (2013.01); *G01J 3/46* (2013.01); *G01J 3/51* (2013.01); *G01N 15/147* (2013.01); *G01N 15/1429* (2013.01); *G01N 15/1484* (2013.01); *G01N 2015/1006* (2013.01); *G01N 2015/1402* (2013.01); *G01N 2015/149* (2013.01); *G01N 2015/1497* (2013.01)

(56) References Cited

U.S. PATENT DOCUMENTS

| | | | |
|---|---|---|---|
| 9,726,527 | B2 | 8/2017 | Norton et al. |
| 9,797,836 | B1 * | 10/2017 | Sinclair ............... G01N 15/147 |
| 10,525,462 | B2 | 1/2020 | Brown et al. |
| 2002/0186874 | A1 * | 12/2002 | Price .................... G01N 15/147 382/173 |
| 2003/0119050 | A1 | 6/2003 | Shai |
| 2005/0221339 | A1 | 10/2005 | Griffiths et al. |
| 2006/0164307 | A1 | 7/2006 | Smith et al. |
| 2006/0177348 | A1 | 8/2006 | Yasuda et al. |
| 2006/0204071 | A1 | 9/2006 | Ortyn et al. |
| 2010/0302599 | A1 | 12/2010 | Goto et al. |
| 2012/0220022 | A1 * | 8/2012 | Ehrlich ................. G01N 15/14 435/286.2 |
| 2013/0074614 | A1 | 3/2013 | Holmes et al. |
| 2013/0130226 | A1 | 5/2013 | Lim et al. |
| 2014/0073000 | A1 | 3/2014 | Sun et al. |
| 2014/0376816 | A1 | 12/2014 | Lagae et al. |
| 2015/0119628 | A1 | 4/2015 | Bharat et al. |
| 2015/0268244 | A1 | 9/2015 | Cho et al. |
| 2016/0084863 | A1 | 3/2016 | Holmes et al. |
| 2017/0122861 | A1 | 5/2017 | Lin |
| 2017/0307502 | A1 | 10/2017 | Mason et al. |
| 2018/0031480 | A1 | 2/2018 | Sinclair |

FOREIGN PATENT DOCUMENTS

| | | | | |
|---|---|---|---|---|
| CN | 104204768 | A | 12/2014 | |
| CN | 104520435 | A | 4/2015 | |
| CN | 104870652 | A | 8/2015 | |
| CN | 105008895 | A | 10/2015 | |
| EP | 0681177 | A1 | 8/1995 | |
| EP | 2169382 | A2 | 3/2010 | |
| EP | 2602608 | A1 | 6/2013 | |
| EP | 2959774 | A1 | 12/2015 | |
| JP | 2010145366 | A | 7/2010 | |
| JP | 2014503195 | A | 2/2014 | |
| JP | 2015500475 | A | 1/2015 | |
| WO | 2012068287 | A2 | 5/2012 | |
| WO | 2015200857 | A1 | 12/2015 | |
| WO | WO-2015200857 | A1 * | 12/2015 | ............ C12M 47/04 |
| WO | 2016054293 | A1 | 4/2016 | |

OTHER PUBLICATIONS

EPO, Extended European Search Report for European Patent Application No. 17811122.5. dated Dec. 12, 2019. 10 pages.
ISA, International Search Report and Written Opinion for International Patent Application No. PCT/US2017/036864. dated Sep. 1, 2017. 9 pages.
EPO, Office Action for European Patent Application No. 17811122. 5. dated Dec. 2, 2020. 5 pages.
JPO, Notice of Reasons for Refusal for Japanese Patent Application No. 2018-564303m dated Jul. 7, 2021. 8 pages with English translation.
CNIPA, First Office Action for Chinese Application No. 201780046504. 9. dated Jan. 26, 2022. 12 pages with English translation.
CNIPA, Second Office Action for Chinese Application No. 201780046504.9. dated Jul. 27, 2022. 3 pages with English translation.
JPO, Decision to Grant a Patent for Japanese Application No. 2018-564303. dated Apr. 8, 2022. 5 pages with English translation.
JPO, Notice of Reasons for Refusal for Japanese Application No. 2022-076473. dated Mar. 29, 2023. 4 pages with English translation.

* cited by examiner

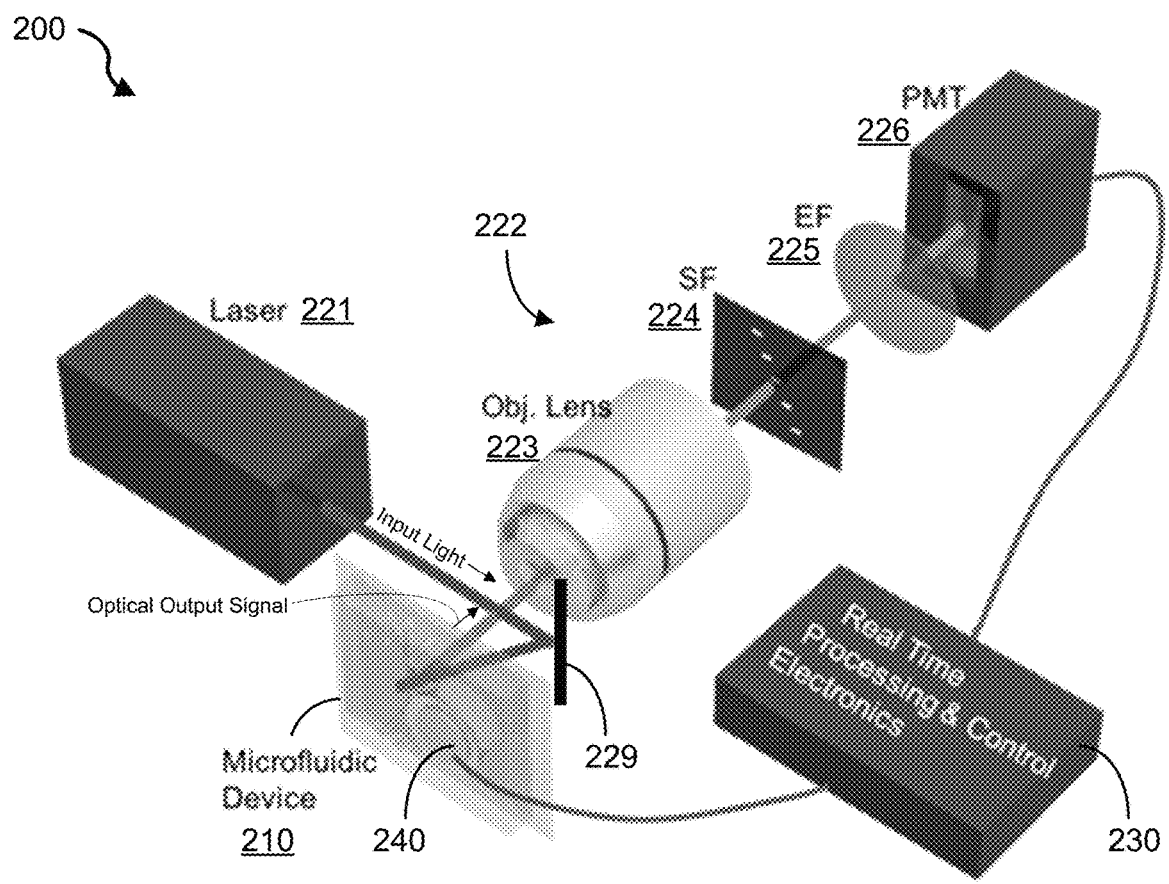
FIG. 2A
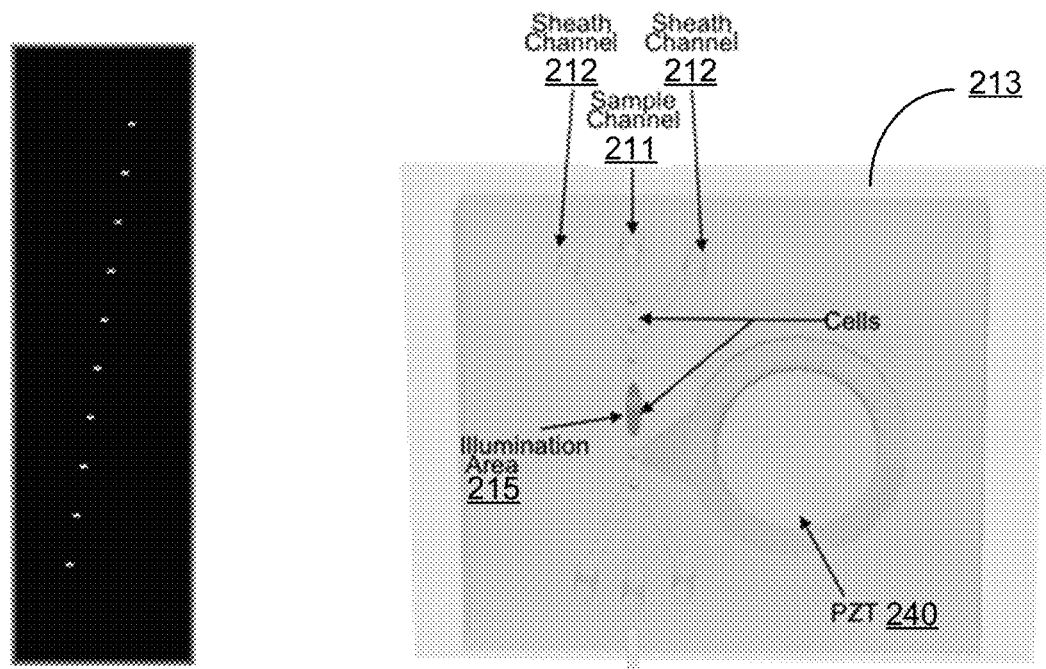
FIG. 2B
FIG. 2C

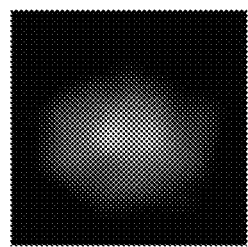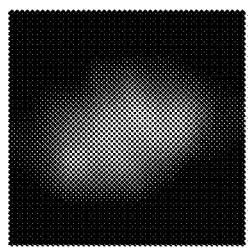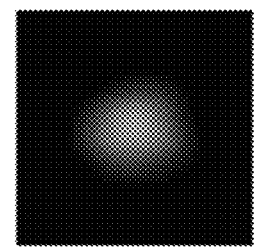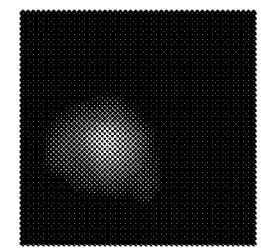
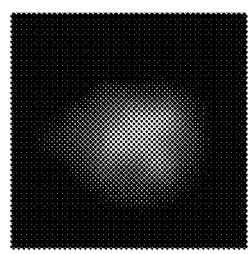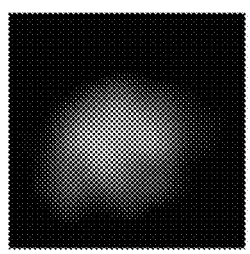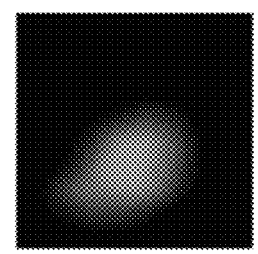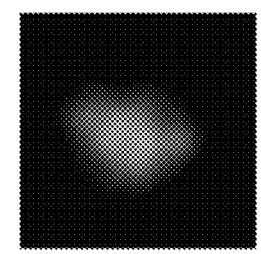
FIG. 9A                                   FIG. 9B
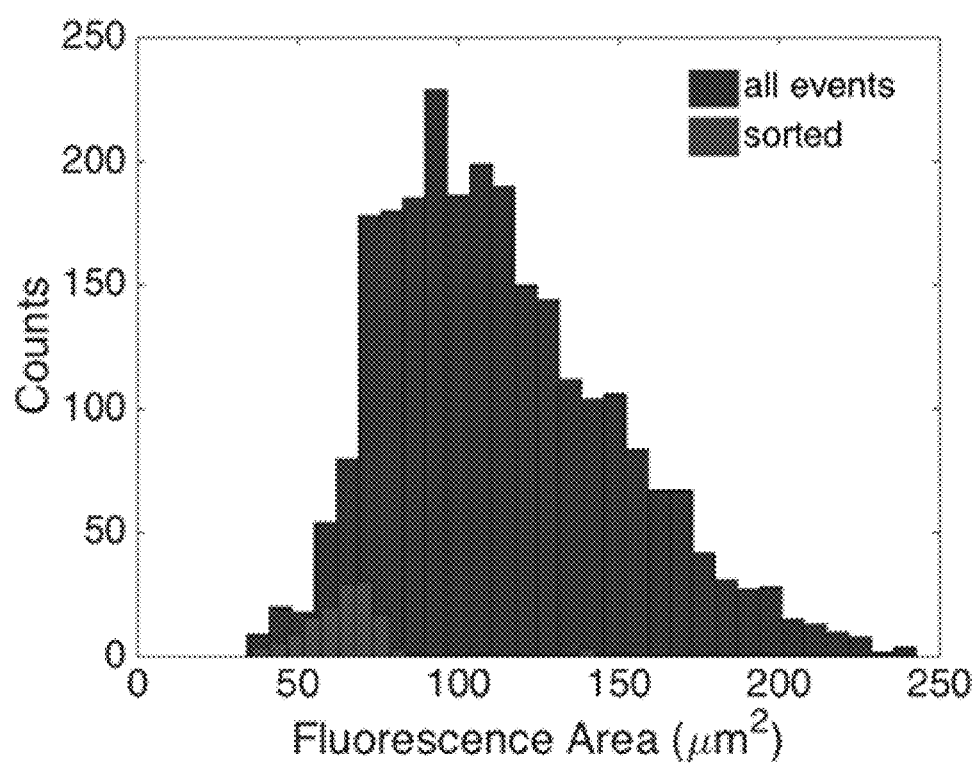
FIG. 10

IMAGE-BASED CELL SORTING SYSTEMS AND METHODS

CROSS-REFERENCE TO RELATED APPLICATIONS

This patent document is a continuation of U.S. patent application Ser. No. 16/307,449, entitled "IMAGE-BASED CELL SORTING SYSTEMS AND METHODS" filed on Dec. 5, 2018, which is 371 National Phase Application of PCT Application No. PCT/US2017/036864 entitled IMAGE-BASED CELL SORTING SYSTEMS AND METHODS" filed on Jun. 9, 2017, which claims priorities to and benefits of "U.S. Provisional Patent Application No. 62/348,511 entitled "FLOW CYTOMETER WITH IMAGE-BASED CELL SORTING" filed on Jun. 10, 2016. The entire contents of the aforementioned patent applications are incorporated by reference as part of the disclosure of this patent document.

STATEMENT REGARDING FEDERALLY SPONSORED RESEARCH OR DEVELOPMENT

This invention was made with government support under grant no. 1R43DA042636-01 awarded by the National Institutes of Health (NIH). The government has certain rights in the invention.

TECHNICAL FIELD

This patent document relates to systems, devices and techniques for particle sorting in fluid, including flow cytometry devices and techniques and applications in chemical or biological testing and diagnostic measurements.

BACKGROUND

Flow cytometry is a technique to detect and analyze particles, such as living cells, as they flow through a fluid. For example, a flow cytometer device can be used to characterize physical and biochemical properties of cells and/or biochemical molecules or molecule clusters based on their optical, electrical, acoustic, and/or magnetic responses as they are interrogated by in a serial manner. Typically, flow cytometry use an external light source to interrogate the particles, from which optical signals are detected caused by one or more interactions between the input light and the particles, such as forward scattering, side scattering, and fluorescence. Properties measured by flow cytometry include a particle's relative size, granularity, and/or fluorescence intensity.

Cell sorting, including cell sorting at the single-cell level, has become an important feature in the field of flow cytometry as researchers and clinicians become more interested in studying and purifying certain cells, e.g., such as stem cells, circulating tumor cells, and rare bacteria species. Cell sorting can be achieved by various techniques.

Flow cytometry devices and systems can be implemented based on microfluidic technologies for research assays and diagnostics as well as for clinical applications. A microfluidic device is an instrument that can control the behavior of very small amounts of fluid (e.g., such as nL, pL, and fL) through channels with dimensions in relatively small dimensions, e.g., the sub-millimeter range. Microfluidic devices can be implemented to obtain a variety of analytical measurements including molecular diffusion values, chemical binding coefficients, pH values, fluid viscosity, molecular reaction kinetics, etc. Microfluidic devices can be built on microchips to detect, separate and analyze biological samples, which can also be referred to as a lab-on-a-chip. For example, a microfluidic device may use biological fluids or solutions containing cells or cell parts to diagnose diseases. Inside microfluidic channels of, for example, a microfluidic flow cytometer, particles including cells, beads, and macromolecules can be interrogated according to their optical, electrical, acoustic, and/or magnetic responses using flow cytometry techniques.

SUMMARY

The technology disclosed in this patent document can be implemented to provide methods, devices and systems for producing images of particles in a flow system, and in specific configurations, the disclosed technology can be used for imaging particles in real time and subsequently sorting particles, including cells, based on the spatial information from the image. The disclosed techniques can be applied for producing cell images and sorting cells in flow cytometers. In applications, the disclosed technology can be used to detect and sort cells based on the fluorescent and/or scattering intensity by taking into account the spatial information such as the spatial distribution of fluorescence.

In implementations, for example, the disclosed systems possess the high throughput of flow cytometers and high spatial resolution of imaging cytometers, in which the cell images are produced at a fast enough rate to accommodate real-time cell sorting in a flow system based on physical and/or physiological properties of the cell, e.g., as opposed to just a detection event.

In some aspects, an image-based particle sorting system includes a particle flow device structured to include a substrate, a channel formed on the substrate operable to flow cells along a flow direction to a first region of the channel, and two or more output paths branching from the channel at a second region proximate to the first region in the channel; an imaging system interfaced with the particle flow device and operable to obtain image data associated with a cell when the cell is in the first region during flow through the channel; a data processing and control unit in communication with the imaging system, the data processing and control unit including a processor configured to process the image data obtained by the imaging system to determine one or more properties associated with the cell from the processed image data and to produce a control command based on a comparison of the determined one or more properties with a sorting criteria, in which the control command is produced during the cell flowing in the channel and is indicative of a sorting decision determined based on one or more cellular attributes ascertained from the image signal data that corresponds to the cell; and an actuator operatively coupled to the particle flow device and in communication with the actuator, the actuator operable to direct the cell into an output path of the two or more output paths based on to the control command, in which the system is operable to sort each of the cells during flow in the channel within a time frame of 15 ms or less from a first time of image capture by the imaging system to a second time of particle direction by the actuator.

In some aspects, a method for image-based particle sorting includes obtaining image signal data of a cell flowing through a channel of a particle flow device; processing the image signal data to produce an image data set representative of an image of the cell; analyzing the produced image data set to identify one or more properties of the cell from the processed image data; evaluating the one or more identified properties of the cell with a sorting criteria to produce a control command to sort the cell based on one or more cellular attributes ascertained from the image signal data corresponding to the cell during cell flow in the particle flow device; and directing the cell into one of a plurality of output paths of the particle flow device based on to the control command.

In some aspects, an image-based particle sorting system includes a particle flow device structured to include a substrate, a channel formed on the substrate operable to flow particles along a flow direction to a first region of the channel, and two or more output paths branching from the channel at a second region proximate to the first region in the channel; an imaging system interfaced with the particle flow device and operable to obtain image data associated with a particle when the particle is in the first region during flow through the channel; a data processing and control unit in communication with the imaging system, the data processing and control unit including a processor configured to process the image data obtained by the imaging system to determine one or more properties associated with the particle from the processed image data and to produce a control command based on a comparison of the determined one or more properties with a sorting criteria; and an actuator operatively coupled to the particle flow device and in communication with the actuator, the actuator operable to direct the particle into an output path of the two or more output paths based on to the control command, in which the system is operable to sort each of the particles during flow in the channel within a time frame of 15 ms or less from a first time of image capture by the imaging system to a second time of particle direction by the actuator.

In some aspects, a method for image-based sorting of a particle includes obtaining image signal data of a particle flowing through a channel of a particle flow device; processing the image signal data to produce an image data set representative of an image of the particle; analyzing the produced image data set to identify one or more properties of the particle from the processed image data; producing a control command by evaluating the one or more identified properties with a sorting criteria; and directing the particle into one of a plurality of output paths of the particle flow device based on to the control command.

The above and other aspects of the disclosed technology and their implementations and applications are described in greater detail in the drawings, the description and the claims.

BRIEF DESCRIPTION OF THE DRAWINGS

FIGS. 2A-2C show diagrams of an example embodiment of an image-based cell sorting microfluidic system in accordance with the disclosed technology.

FIGS. 9A and 9B show example fluorescence cell images taken by the image-based cell sorter system of transfected but not drug treated cells and transfected and drug treated cells.

FIG. 10 shows a histogram of the example calculated fluorescence area of all events and of the sorted cells from an example implementation.

DETAILED DESCRIPTION

Figure 1A:
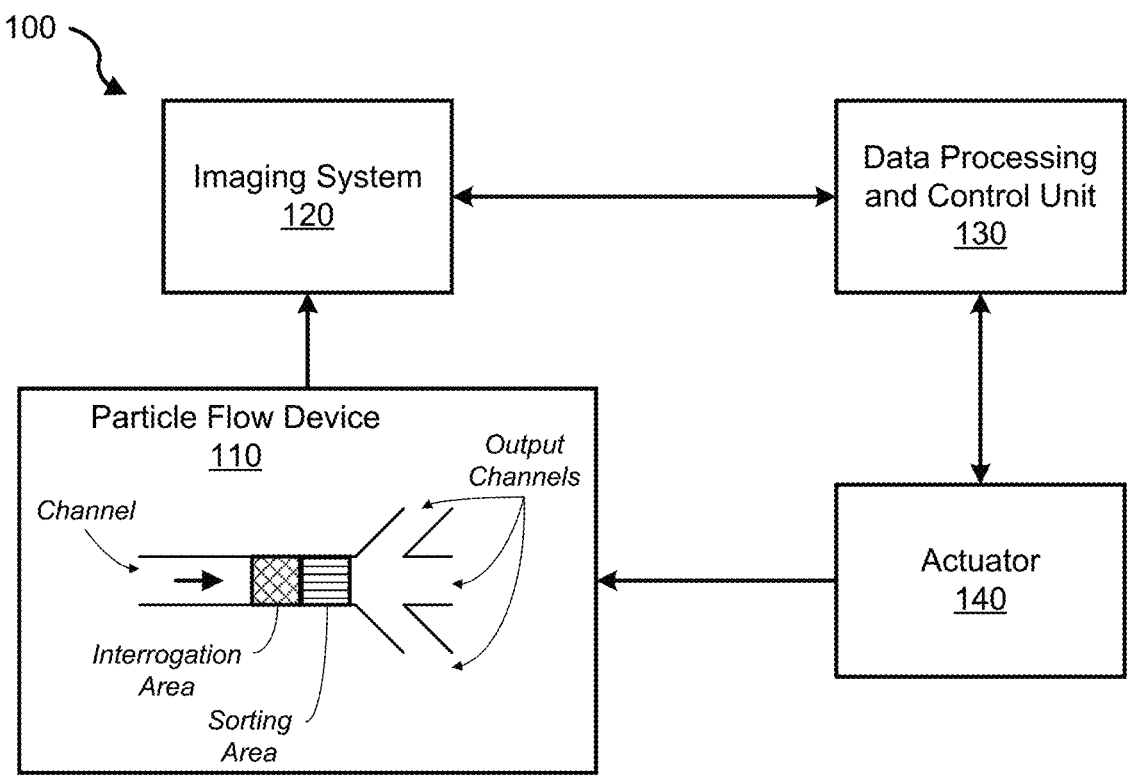
FIG. 1A shows a diagram of an example embodiment of an image-based particle sorting system in accordance with the disclosed technology.

Some existing flow cytometer devices and systems detect and sort cells based on the fluorescence and/or scattering intensity without taking into account the spatial information such as the spatial distribution of fluorescence. There has been some advancements in the development of techniques to produce cell images for flow cytometers with high throughput and high spatial resolution. However, the cell image has not been produced in a fast enough rate to be useful for applications, in particular for cell sorting in a flow system, e.g., due to the required amount of computation to generate the cell image. As such, existing state of the art for cell sorting capabilities are "detection only" systems, and fail to "screen" the detected cells based on meaningful and nuanced criteria.

In applications, the disclosed technology can be implemented in specific ways in the form of methods, systems and devices for image-based cell sorting in flow cytometry using (a) real-time image acquisition of fast travelling cells by efficient data processing techniques utilizing mathematical algorithms implemented with FPGA and/or GPU and concurrent (b) "gating" techniques based on spatial characteristics of the particles as the sorting criteria from the real-time acquired images. Unlike traditional flow cytometers that use fluorescent intensities of chosen biomarkers as criteria for cell sorting, the methods, systems and devices in accordance with the disclosed technology allow for various user-defined gating criteria containing spatial features.

Examples of image-based gating criteria include cell contour, cell size, cell shape, size and shape of internal cell structures such as the cell nucleus, fluorescent patterns, fluorescent color distribution, etc. For example, users can draw the cells they wish to separate and the system will perform accordingly. With such unique capabilities, users such as researchers can track many important biological processes by localization of certain proteins within cytosolic, nuclear, or cell membrane domains and subdomains. Because every cell population has some degree of heterogeneity at a genomic (e.g., mutations, epigenetics) or environmental (e.g., asymmetric division, morphogen gradients) level, identification and extraction of single-cells according to their unique spatial features are envisioned to contribute significantly to the fields of immunology, tumor heterogeneity, stem cell differentiation, and analysis of neurons.

In some embodiments, an image-based particle sorting system includes a particle flow device, such as a flow cell or a microfluidic device, integrated with a particle sorting actuator; a high-speed and high-sensitivity optical imaging system; and a real-time cell image processing and sorting control electronic system. For example, an objective of the disclosed methods, systems and devices is to perform the entire process of (i) image capture of a particle (e.g., cell), (ii) image feature reconstruction from a time-domain signal, and (iii) making a particle sorting decision and sorting operation by the actuator within a latency of less than 15 ms to fulfill the needs for real-time particle sorting. In some implementations described herein, the total latency is less than 8 ms (e.g., 7.8 ms), in some implementations, the total latency is less than 6 ms (e.g., 5.8 ms), and in some implementations, the total latency is less than 3.5 ms (e.g., 3.3 ms). For implementations of cell sorting, for examples, the disclosed methods, systems and devices are able to image, analyze and sort cells by image features specific to life cycles, protein localization, gene localization, DNA damages, and other cellular properties, which can be connected to different diseases or pathogens.

FIG. 1A shows a diagram of an example embodiment of an image-based particle sorting system 100 in accordance with the present technology. The system 100 includes a particle flow device 110, an imaging system 120 interfaced with the particle flow device 110, a data processing and control unit 130 in communication with the imaging system 120, and an actuator 140 in communication with the data processing and control unit 130 and operatively coupled to the particle flow device 110. The particle flow device 110 is structured to include a channel 111 in which particles flow along a flow direction to an interrogation area 115 where image data are obtained by the imaging system 120 for each particle in the interrogation area 115. The data processing and control unit 130 is configured to process the image data and determine one or more properties associated with the particle to produce a control command for sorting of the particle. The control command is provided to the actuator 140, which is interfaced with the particle flow device 110 at a sorting area of the device 110, such that the actuator operates to sort the particular particle into an output channel corresponding to the control command. The system 100 implements image-based sorting of the particles in real-time, in which a particle is imaged by the imaging system 120 in the interrogation area and sorted by the actuator 140 in the sorting area in real time and based on a determined property analyzed by the data processing and control unit 130.

The system 100 is user-programmable to sort each particle based on user-defined criteria that can be associated with one or more of a plurality of properties exhibited by each individual particle analyzed in real time by the data processing and control unit 130. Some example user-defined criteria include, but are not limited to, an amount and/or size of sub-features of or on the individual particle (e.g., sub-particles attached to living cells, including particles engulfed by cells or attached to cells); morphology of the individual particle; and/or size of the individual particle. In this manner, the system 100 is able to evaluate and sort particles by properties, such as properties of living cells, including sorting by cellular physiological functionalities (e.g., particle or substance uptake by a cell, or particle engulfment by a cell), by cell damage, by localization of proteins, or by other cellular properties.

Figure 1B:
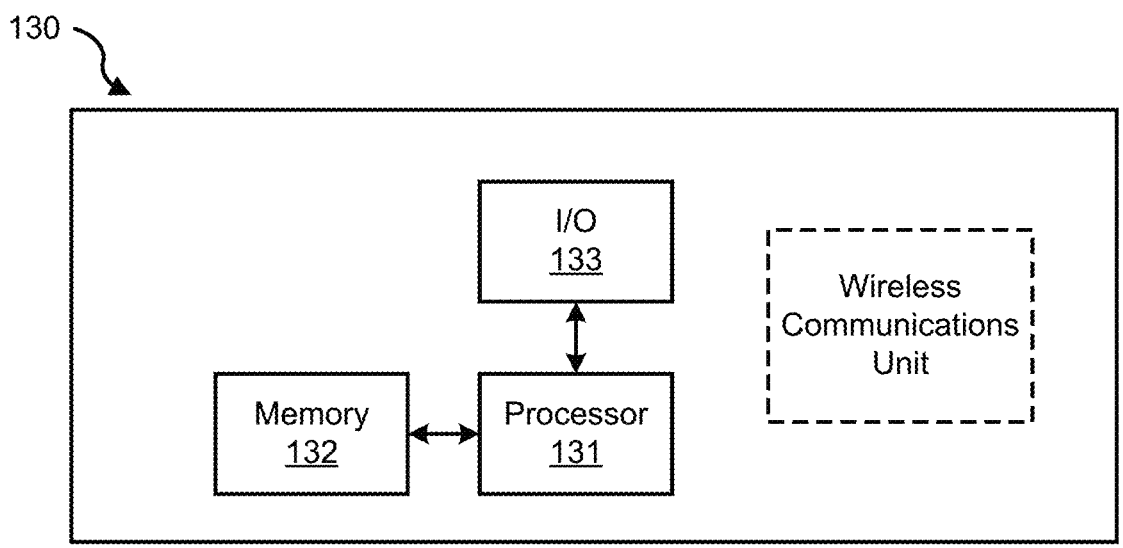
FIG. 1B shows a block diagram of an example embodiment of a data processing and control unit of an image-based particle sorting system in accordance with the disclosed technology.

FIG. 1B shows a block diagram of an example embodiment of the data processing and control unit 130. In various implementations, the data processing and control unit 130 is embodied on one or more personal computing devices, e.g., including a desktop or laptop computer, one or more computing devices in a computer system or communication network accessible via the Internet (referred to as "the cloud") including servers and/or databases in the cloud, and/or one or more mobile computing devices, such as a smartphone, tablet, or wearable computer device including a smartwatch or smartglasses. The data processing and control unit 130 includes a processor 131 to process data, and memory 132 in communication with the processor 131 to store and/or buffer data. For example, the processor 131 can include a central processing unit (CPU) or a microcontroller unit (MCU). In some implementations, the process 131 can include a field-programmable gate-array (FPGA) or a graphics processing unit (GPU).

For example, the memory 132 can include and store processor-executable code, which when executed by the processor 131, configures the data processing and control unit 130 to perform various operations, e.g., such as receiving information, commands, and/or data, processing information and data, such as from the imaging system 120, and transmitting or providing processed information/data to another device, such as the actuator 140. To support various functions of the data processing and control unit 130, the memory 132 can store information and data, such as instructions, software, values, images, and other data processed or referenced by the processor 131. For example, various types of Random Access Memory (RAM) devices, Read Only Memory (ROM) devices, Flash Memory devices, and other suitable storage media can be used to implement storage functions of the memory 132. In some implementations, the data processing and control unit 130 includes an input/output (I/O) unit 133 to interface the processor 131 and/or memory 132 to other modules, units or devices. In some embodiments, such as for mobile computing devices, the data processing and control unit 130 includes a wireless communications unit, e.g., such as a transmitter (Tx) or a transmitter/receiver (Tx/Rx) unit. For example, in such embodiments, the I/O unit 133 can interface the processor 131 and memory 132 with the wireless communications unit, e.g., to utilize various types of wireless interfaces compatible with typical data communication standards, which can be used in communications of the data processing and control unit 130 with other devices, e.g., such as between the one or more computers in the cloud and the user device. The data communication standards include, but are not limited to, Bluetooth, Bluetooth low energy (BLE), Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE cellular communication methods, and parallel interfaces. In some implementations, the data processing and control unit 130 can interface with other devices using a wired connection via the I/O unit 133. The data processing and control unit 130 can also interface with other external interfaces, sources of data storage, and/or visual or audio display devices, etc. to retrieve and transfer data and information that can be processed by the processor 131, stored in the memory 132, or exhibited on an output unit of a display device or an external device.

FIGS. 2A-2C show diagrams of an image-based cell sorting microfluidic system 200 in accordance with some embodiments of the image-based particle sorting system 100. The system 200 includes a microfluidic device 210 to flow particles through an optical interrogation channel for sorting, an imaging system 220 to obtain image data of the particles in an illumination area of the interrogation channel, a data processing and control system 230 to process the obtained image data in real time and determine a sorting command, and an actuator 240 to gate the particles in the microfluidic device 210 based on the determined sorting command.

As shown in FIG. 2A and FIG. 2C, the microfluidic device 210 structured to include a substrate 213 having a passage forming a microfluidic sample channel 211, and microfluidic sheath channels 212 that converge upon the sample channel 211. In implementations, for example, the sample channel is configured to carry particles (e.g., cells) suspended in a fluid that flows in a flow direction, and the sheath channels 212 are configured to provide sheath flow of fluid to hydrodynamically focus the suspended particles in the fluid prior to flowing through an illumination area 215 of the microfluidic device 210. In some embodiments, for example, the substrate 213 can be formed in a bulk material, e.g., such as polydimethylsiloxane (PDMS), that is bonded to a base substrate, e.g., a glass base substrate or base substrate of other material.

The imaging system 220 of the system 200 includes a light source 221, e.g., a laser, to provide an input or probe light at the illumination area 215 of the microfluidic device 210, and an optical imager 222 to obtain images of the illuminated particles in the illumination area 215. The example optical imager 222, as shown in FIG. 2A, includes an objective lens 223 (e.g., of a microscope or other optical imaging device) optically coupled to a spatial filter (SF) 224, an emission filter (EF) 225, and a photomultiplier tube (PMT) 226. In some implementations, for example, the imaging system 220 includes one or more light guide elements 229 to direct the input light at the illumination area 215 of the microfluidic device 210. In the example shown in FIG. 2A, the light guide element 229 includes a dichroic mirror arranged with the light source 221 and the optical imager 222 to direct the input light at the illumination area 215.

In some implementations of the imaging system 220, the light source 221 (e.g., the laser) is configured to produce a fluorescent excitation signal that is incident upon the illumination area 215 to cause a fluorescent emission by the particles. The optical imager 222 captures the optical output fluorescent emission signal such that an image of the particle can be generated.

The data processing and control system 230 of the system 200 is configured in communication with the optical imager 222, e.g., via the PMT, to rapidly process the imaged particles and produce a sorting control based on the processed image of each particle imaged in real-time. In some implementations of the data processing and control unit 230, a FPGA processing unit is configured to rapidly process the image signal data received by the optical imager 222. An example of such implementations can include a Virtex-II (xc2v3000) FPGA platform in conjunction with a compiler Xilinx 10.1, which can be provided via a chassis Crio-9104 from National Instrument to execute algorithms in accordance with data processing methods of the present technology.

The actuator 240 of the system 200 is configured in communication with the real-time data processing and control system 230 to gate the particle flowing in a gate area 217 of the sample channel 211 into two or more output channels 218 of the microfluidic device. In some embodiments, for example, the distance between the illumination area 215 and the gate area 217 can be in a range of 50 μm to 1 mm. In implementations, the actuator 240 receives the sorting command from the data processing and control system 230 in real time, such that the imaging system 220 and data processing and control system 230 operate to capture and process the image of each particle while flowing through the illumination area 215 so that the actuator 240 receives and executes the sorting command to gate each particle accordingly. For example, in some implementations, the actuator 240 includes a piezoelectric actuator coupled to the substrate 213 to produce deflection that causes the particle to move in a particle direction in the gate area 217 that directs the particle along a trajectory to one of the two or more of output channels 218.

In implementations of the system 200, for example, the suspended single cells are hydrodynamically focused in the microfluidic channel by sheath flow, ensuring that the cells travel in the center of the fluidic channel at a uniform velocity. A fluorescence emission is detected by the PMT 226 in a wide-field fluorescence microscope configuration, such as in the example shown in FIG. 2A. In this example, to accommodate the geometry of the microfluidic device, the laser beam is introduced to the optical interrogation by 52-degree reflection by a miniature dichroic mirror (DM) 229 positioned in front of a 50× objective lens 223 (e.g., with NA=0.55, working distance=13 mm).

FIG. 2B shows an example embodiment of the spatial filter (SF) 225 that is inserted in the detection path right at the image plane of the optical imager 222 of the imaging system 220. The spatial filter design includes a pattern having a plurality of slits positioned apart. In some embodiments, for example, the spatial filter 225 includes a pattern of openings having uniform dimensions, in which the pattern of openings encodes a waveform on the received light by the optical imager. In the example shown in FIG. 2B, the pattern includes ten 100 µm by 50 µm slits positioned apart in the way of one is immediately after another. In some embodiments, for example, the spatial filter 225 includes a pattern of openings having a varying longitudinal and transverse dimensions with respect to the flow direction across the microfluidic channel, such that a waveform is encoded by the optical imager to allow optical detection of a position of a particle in at least two dimensions in the illumination area 215 of the microfluidic channel 211. An example of two-dimensional spatially-varying spatial filter is provided in U.S. Pat. No. 9,074,978 B2 entitled "OPTICAL SPACE-TIME CODING TECHNIQUE IN MICROFLUIDIC DEVICES", the entire content of which is incorporated by reference as part of this disclosure for all purposes.

Referring back to FIG. 2A, although the imaging system 220 shows only one PMT for detection of fluorescent signal, it is understood that more PMTs can be added to the optical imager 222, and, if necessary, more excitation laser beams added to the light source 221, to produce multi-color fluorescent cell images.

The real-time data processing and control system 230 includes a control loop system that is implemented using a field-programmable gate-array (FPGA) to process the captured images and produce the corresponding sorting commands for each particle. The data processing and control system 230 includes image processing and image-based particle sorting algorithms executable by the FPGA to provide automated cell image generation and accurate sorting by the system 200. For example, once a sorting decision is made by the FPGA algorithm, the example on-chip integrated piezoelectric lead-zirconate-titanate (PZT) actuator 240 is actuated to apply fluidic pressure at the nozzle structure at the sorting junction. In some implementations, the example PZT actuator 240 is configured to execute the fluid displacement operation in response to the sorting command in a time frame at or less than 0.1 ms per operation. For example, the fluid displacement by the PZT actuator in less than 0.1 ms exhibits single cell hydrodynamic manipulation capabilities with a high throughput.

Other examples of features of a particle flow device and/or an actuator that can be used in example embodiments of the devices, systems, and methods in accordance with the disclosed technology are provided in U.S. Pat. No. 9,134,221 B2 entitled "FLUIDIC FLOW CYTOMETRY DEVICES AND PARTICLE SENSING BASED ON SIGNAL ENCODING", the entire content of which is incorporated by reference as part of this disclosure for all purposes. Other examples of features of an optical imaging system that can be used in example embodiments of the devices, systems, and methods in accordance are provided in U.S. patent application Ser. No. 15/514,930 which is a U.S. National Stage Application filing under 35 U.S.C. § 371 based on PCT Application No. PCT/US2015/053368 entitled "IMAGING FLOW CYTOMETRY USING SPATIAL-TEMPORAL TRANSFORMATION" and published as WO2016/054293A1, the entire content of which is incorporated by reference as part of this disclosure for all purposes.

Figure 3B:
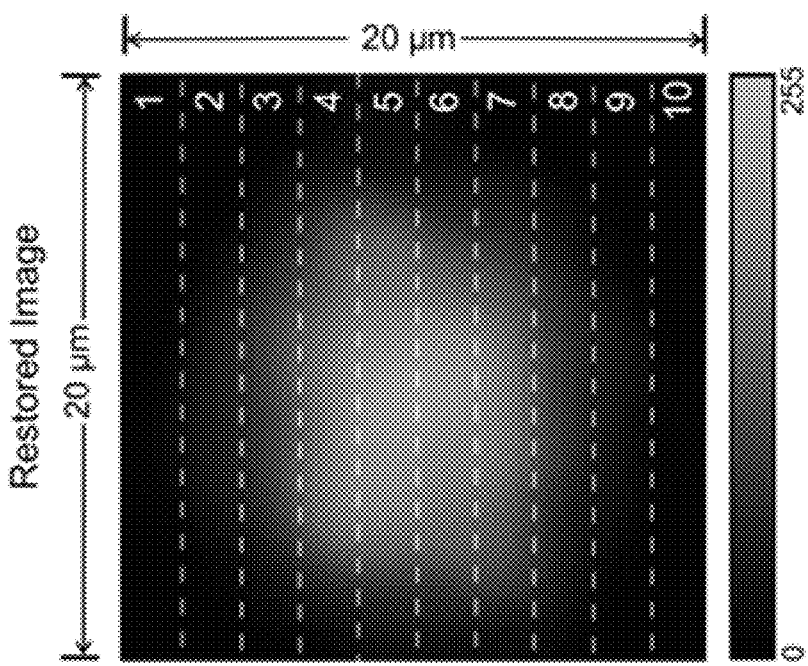
FIGS. 3A and 3B show example captured and processed image data from PMT signals to produce cell images for image-based particle sorting techniques in accordance with the disclosed technology.
Figure 3A:
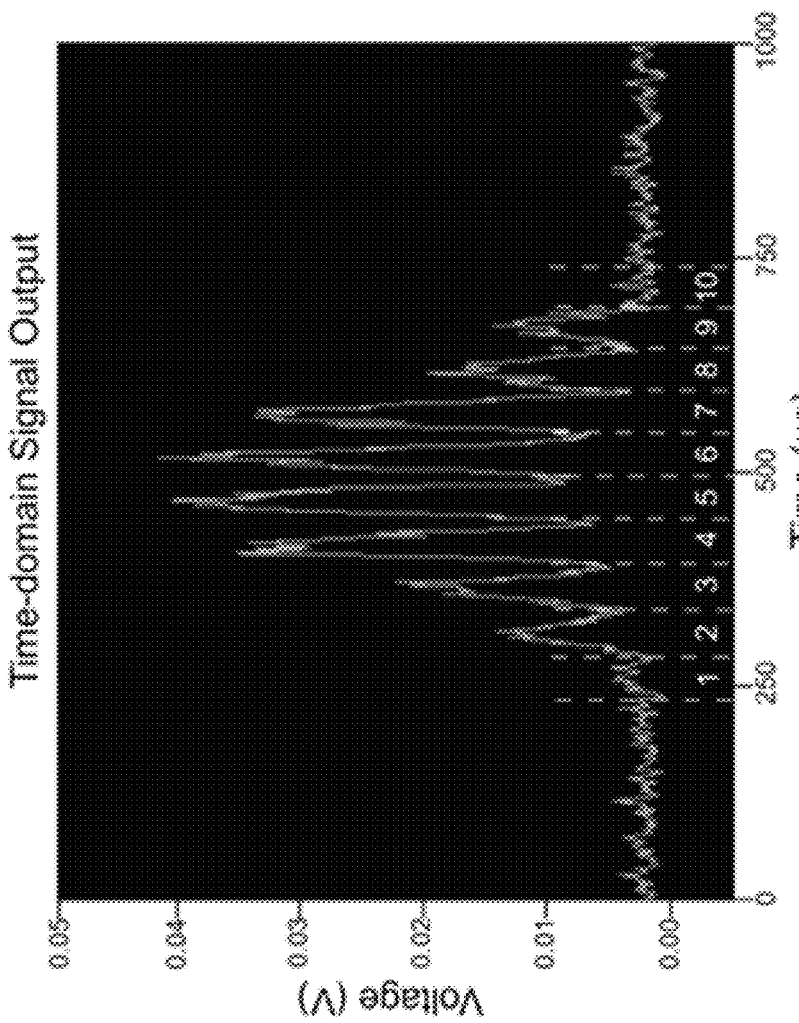

FIGS. 3A and 3B show example results of a PMT signal and the fluorescence cell image constructed from the PMT signal, processed by the example data processing and control system 230, using an example algorithm described in FIG. 4 and executed by the example FPGA. FIG. 3A shows an example time-domain PMT output signal of fluorescent light from a A549 cell stained with CellTrace CFSE. FIG. 3B shows the corresponding processed (e.g., re-sized) fluorescence image depicting the real size of the cell. The numbered regions segmented by dashed lines in the figures demonstrate the correspondence between the time-domain signal and the resulting image. Size is labeled in FIG. 3B.

The spatial resolution of the restored image in x-(transverse) direction depends on the number of the slits on the spatial filter, and in y-(cell-travelling) direction depends on the sampling rate and cell flow rate. In the original image restored by the imaging flow cytometer (shown in FIG. 3B), the effective pixel size is 2 µm in x-direction and about 0.4 µm in y-direction. The recovered image represents a 20 µm by 20 µm area in the object plane in the microfluidic channel.

Figure 4A:
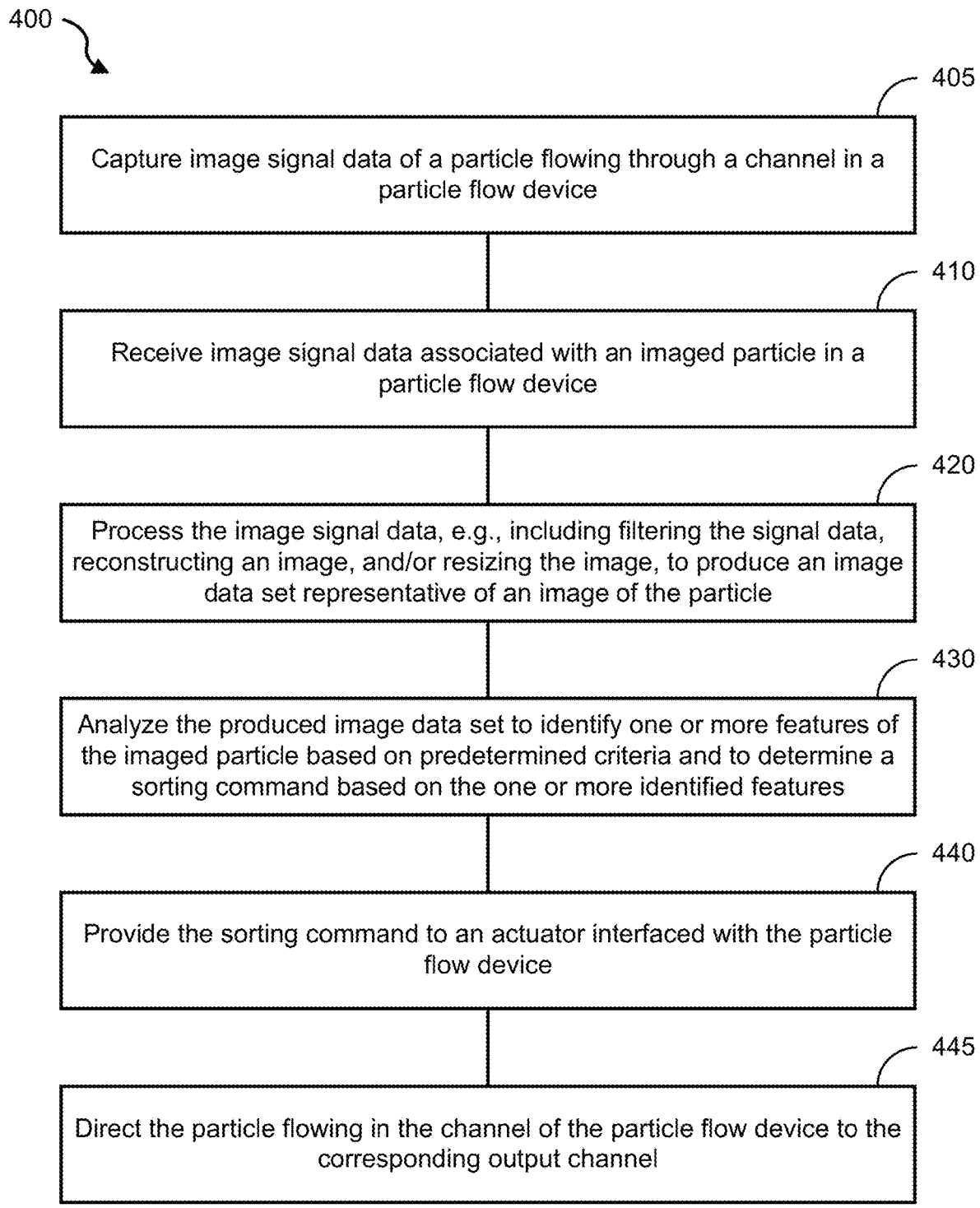
FIGS. 4A-4C show diagrams of example embodiments of processes of image-based particle sorting methods in accordance with the present technology.

FIG. 4A shows a diagram of an example embodiment of a method 400 for image-based sorting of particles. Implementations of the method 400 can be performed by the various embodiments of the image-based particle sorting system 100 in accordance with the present technology, such as the system 200 and the system 1100.

The method 400 includes a process 405 to capture image data, by the imaging system 120, of a particle flowing through a channel in the particle flow device 110, e.g., at the interrogation area 115. For example, the process 405 can include continuously capturing images at a predetermined rate or varying rates, which may be based on the particle flow speed in the channel. In some implementations, the process 405 includes receiving, at a controller of the imaging system 120, an image capture command from the data processing and control unit 230 to affect the image capture protocol to obtain the image data. For example, the data processing and control unit 130 can change one or more parameters of the image capture protocol executed by the imaging system 120 in real-time implementations of the system.

The image capture rate can be associated with the data volume of single particles. For example, the system can determine the image capture rate and/or other parameters of image capture protocol based at least in part on (a) the particle flow speed of the particle flow device 110 and (b) the electronic sampling rate, e.g., depending on what resolution is desired, which can be used to determine the data volume of single particles. The image capture rate can be associated with the data recording/computing capabilities of the data processing and control unit 130 and/or a controller (e.g., processor) of the imaging system 120. For example, higher speed analog-to-digital conversion (ADC) and larger memory can increase the image capture rate. The image capture protocol including image capture and processing parameters can be selected based at least in part on that the design of the spatial filter, e.g., as in some implementations the optical output from the spatial filter can affect the processing of the algorithm complexity. Notably, optical factors, such as magnification, optical filters, imaging mode, etc. typically have little, if any, influence on the image capture speed, but are significant in obtaining the input data that is processed to produce the overall results, e.g., determination of the particle properties that are evaluated for determining a sorting decision or other analyses.

The method 400 includes a process 410 to receive the image data, at the data processing and control unit 130 and from the imaging system 120, in which the received data is associated with a particle imaged by the imaging system 120 flowing in the channel of the particle flow device 110. For example, in some implementations of the process 410, the data processing and control unit 130 receives time domain signal data, e.g., optical intensity, from one or more PMTs of the imaging system 120 for each particle imaged in the illumination area on the particle flow device 110. The method 400 includes a process 420 to process the data (e.g., image signal data) to produce an image data set representative of an image of the particle imaged by the imaging system 120. For example, in some implementations of the process 420, the received image signal data is pre-processed by filtering the data, reconstructing an image based on the filtered data using an image reconstruction algorithm in accordance with the present technology, and/or resizing the reconstructed image, e.g., in which the reconstructed image is converted to binary image data. The method 400 includes a process 430 to analyze the produced image data set to identify one or more features of the imaged particle based on predetermined criteria and to determine a sorting command based on the one or more identified features. In some implementations of the method, the method 400 includes a process 415 to first process the received image signal data to detect a presence of the particle in the illumination area, and then process the data in accordance with the process 420 to produce the image data set that is subsequently analyzed in accordance with the process 430. The method 400 includes a process 440 to provide the sorting command to the actuator 140. The method 400 includes a process 445 to execute, by the actuator 140, the sorting command to direct the particle flowing in sorting area of the channel of the particle flow device 110 to the corresponding output channel of the device 110. For example, in implementations of the method 400, the imaging system 120 and the data processing and control system 230 implement the processes 405 and 410, 420, 430, and 440, respectively, in real time, such that the actuator 140 receives and executes the sorting command to direct the particles accordingly, e.g., gate each particle to the appropriate output channel of the device 110, within a diminutive time period from the image capture (process 405) to the actuation of particle gating (process 445). For example, in some implementations of the process 445, the actuator 140 includes a piezoelectric actuator coupled to the flow device 110 to produce hydrodynamic deflection in the fluid that causes the particle to move in a particle direction along a desired trajectory to enter the desired output channel.

In some embodiments, the data processing and control unit 130 includes software modules corresponding to one or any combination of the processes 410, 420, 430 and 440 stored in the memory 132 and executable by the processor 131 to implement the processes 410, 420, 430 and/or 440. FIG. 4B shows a diagram of example data processing modules of the systems in accordance with the present technology. For example, the data processing and control unit 130 can include a Particle Detection module 461, a Process Image module 463, and a Make Sorting Decision module 465. As shown by the example diagram of FIG. 4B, once a particle (e.g., cell) is detected by implementing the algorithms executable by the Particle Detection module 461, the data processing and control unit 130 proceeds to implement the Process Image module 463 if a particle (e.g., cell) is detected, otherwise, it returns to keep recording images, e.g., via PMT readout. By extracting parameters from cell images and comparing those values to pre-defining sorting criteria, e.g., performed by the Process Image module 463, the Make Sorting Decision module 465 is implemented to determine whether to trigger the actuator 140 or not. In some embodiments, the data processing and control unit 130 includes a Record Image module 467 to control, at least partially, the imaging system 120 to implement the process 405, e.g., which can include initiating and/or adapting the image capture protocol or settings of the imaging system. For example, in some implementations such as with the imager 222, when the Record Image module 467 is operable to control the recording of the PMT readout in a certain length.

In some implementations, the parameters associated with particle properties (e.g., cell properties) are extracted based on the type of parameter or parameters to be extracted. For example, for different morphology parameters, the process to extract the parameters associated with cell morphological properties can include at least some of the following techniques. The process can include analyzing the image area, for example, including determining the number of pixels with value "1" in the binary image. The number of pixels is image area. The process can include analyzing the perimeter, for example, including determining the number of pixels on the image contour, e.g., as the image contour is detected. The process can include analyzing the diameter in the x direction, for example, including (e.g., in a binary image) determining the number of "1" pixels in each row that represents the x direction. For example, the largest count can be determined as the diameter in x direction. The process can include analyzing the diameter in the y direction, for example, including (e.g., in a binary image), determining the number of "1" pixels in each column that represents the y direction. For example, the largest count can be determined as the diameter in y direction.

Figure 4C:
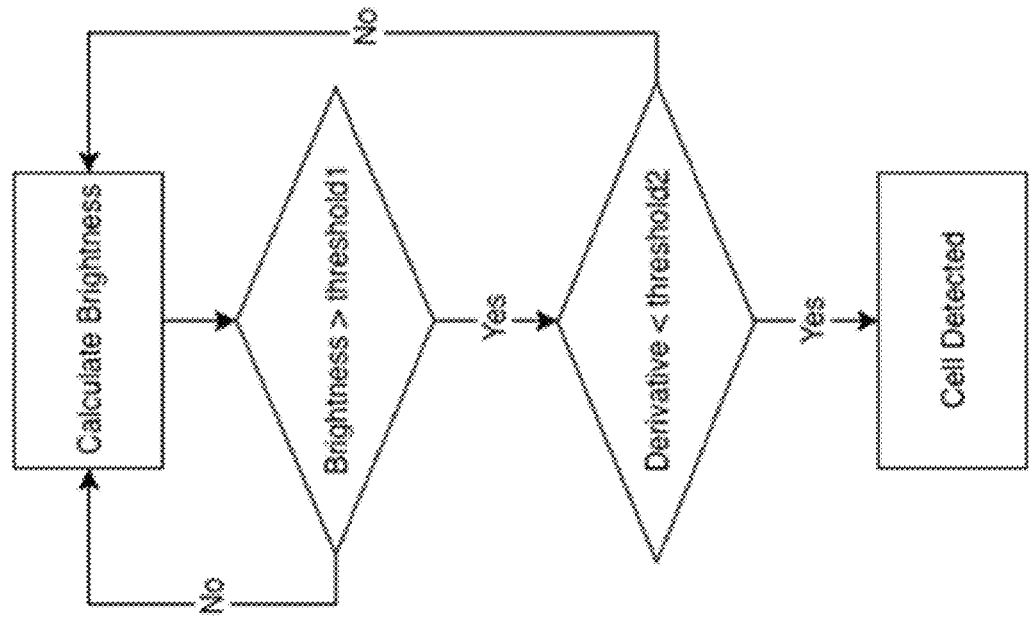
Figure 4B:
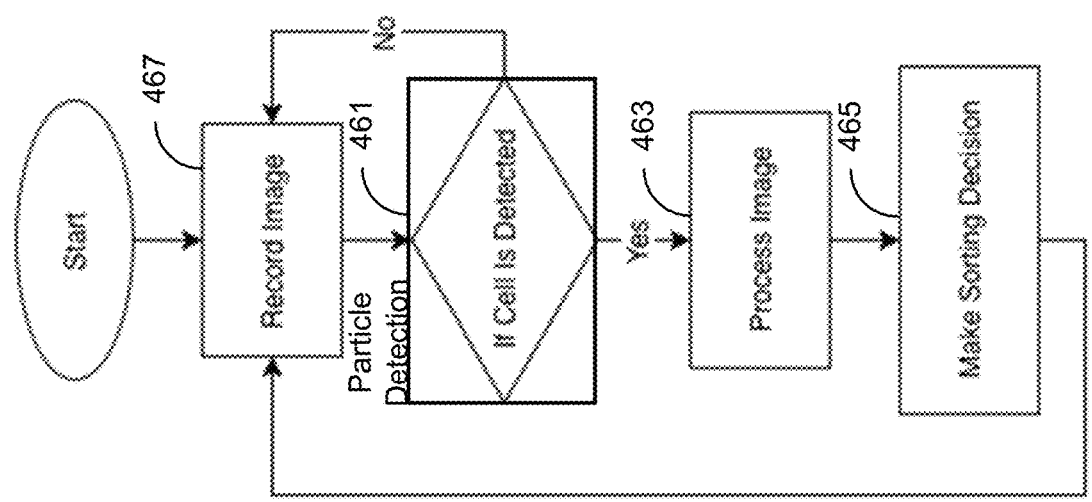

FIG. 4C shows a diagram of an example implementation of the process 430, e.g., implementation of the Particle Detection module 461, to detect cells for image-based cell sorting. In some implementations, for example, the Particle Detection module 461 searches for a section of the time-domain PMT signal that has integrated fluorescence intensity, referred to herein as "brightness", that is larger than a preset threshold. For example, in some implementations, the cell-travelling speed in the flow cell or microfluidic device is 0.08 m/s, and a 200 kHz sampling rate is used, such that the particle sorting and image processing algorithm integrates every consecutive 500 data points to obtain the value of brightness. Every time when the brightness is larger than a first preset threshold, e.g., threshold1, this means a cell is entering the optical system's field of view in the image plane. The algorithm determines the time derivative of brightness, which is then compared to a second preset threshold, e.g., threshold2. If the time derivative is smaller than threshold2, the algorithm considers that the cell is well within the field of view, and the example process 430 continues to determine an identified feature or features of the detected cell, e.g., implementation of the Process Image module 463 is consequently initiated.

Figure 4D:
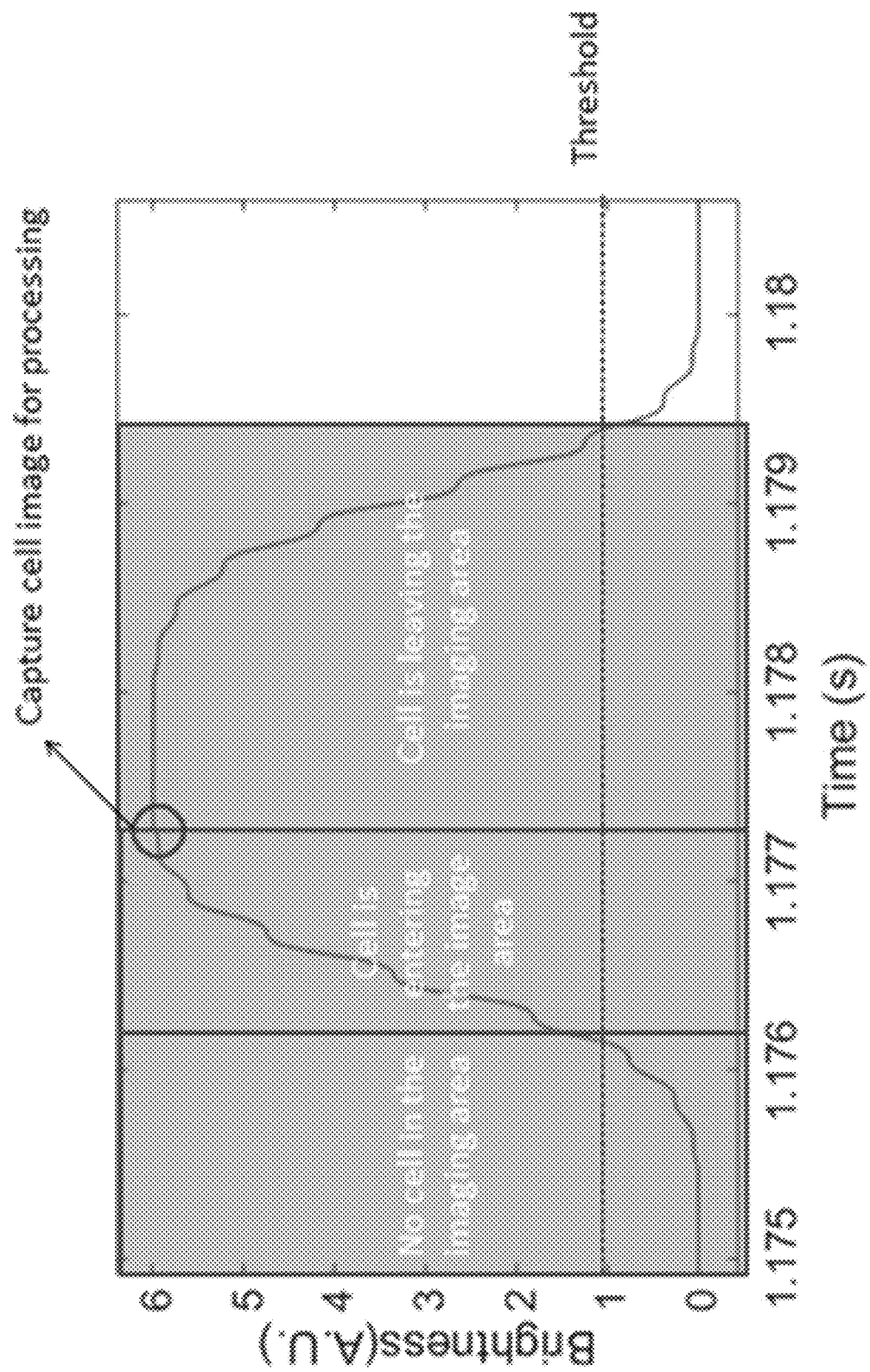
FIG. 4D shows a brightness-time plot depicting an example cell detection process implementation based on the processing of a time-domain PMT signal associated with a single cell traveling through the illumination area of an example system in accordance with the present technology.

FIG. 4D shows a brightness-time plot depicting an example cell detection process implementation based on the processing of a time-domain PMT signal associated with a single cell traveling through the illumination area of the system. As shown in the plot, a cell is detected to enter the imaging area (e.g., interrogation area 115) based on a threshold (e.g., brightness≥1.0) just after the 1.176 s time marker, and the system captures image signal data until the cell is detected to depart the imaging area based on the threshold (e.g., brightness≤1.0) after the 1.179 s time marker.

Figure 5A:
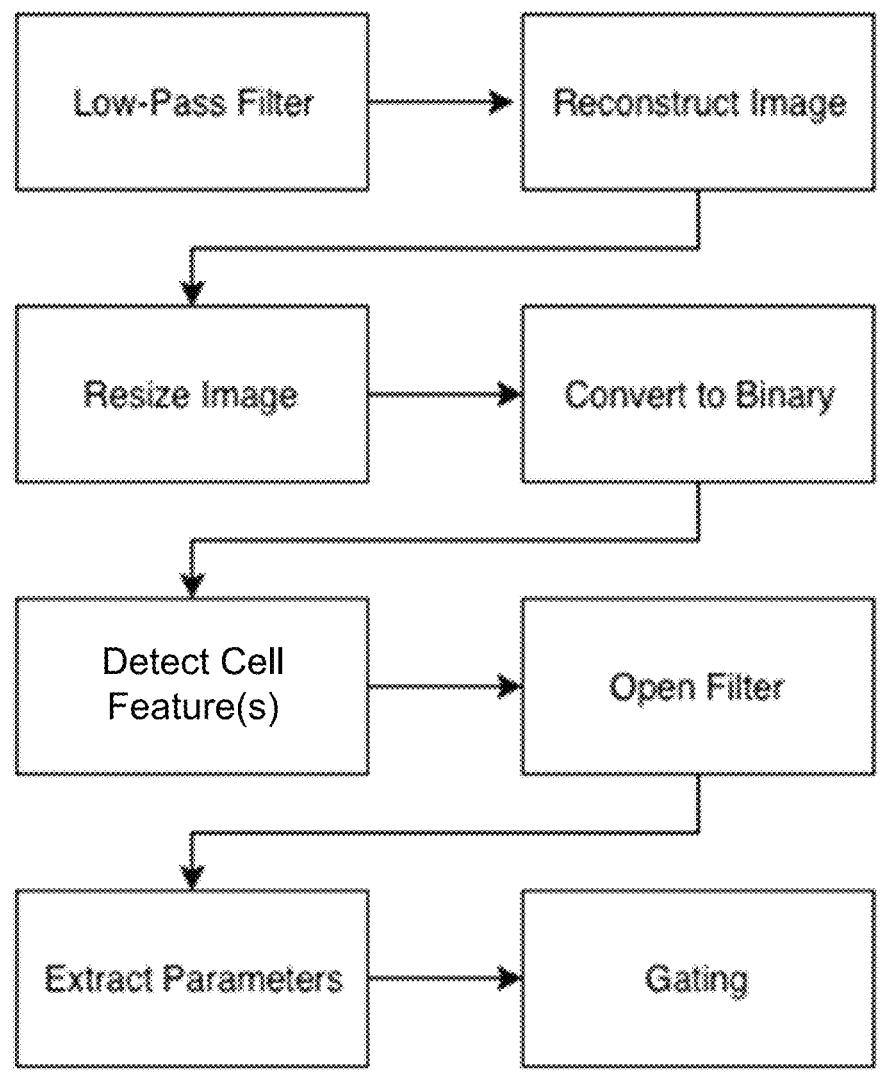
FIG. 5A shows a diagram of an example implementation of a process to determine an identified feature or features of a detected cell for image-based cell sorting.

FIG. 5A shows a diagram of an example implementation of the process 430, e.g., implementation of the Process Image module 463, to determine an identified feature or features of the detected cell for image-based cell sorting. In the example shown in FIG. 5A, the process 420 is implemented after some aspects of the process 430, e.g., particularly after analysis of image signal data to determine if a cell is detected or not. For example, in some implementations as shown in FIG. 5A, after the partial analysis of the received image signal data to determine the presence of a cell, the Process Image module 463 pre-processes the image signal data (e.g., time-domain PMT signal) including filtering or other signal processing techniques. For example, in some implementations, the received image signal data is low-pass filtered to eliminate high frequency noise. In some examples, a $10^{th}$ order hamming window for low-pass filtering is used, which is an example of a particular low pass filter applicable. The Process Image module 463 can implement other features of the process 420 including image reconstruction techniques (e.g., based on an example algorithm described herein, including Equation (1)) to turn the time-domain signal into an image that represents 2-dimensional spatial distribution of the cells' fluorescence. After that, the reconstructed cell image is resized for fidelity purpose and converted into binary image. For binary images, for example, an optional open filter technique is applied to remove spurious noise, and the Process Image module 463 detects one or more cell features (e.g., the cell wall or membrane detection) after the open filter is applied. In some implementations, the open filter can be applied after cell feature(s) have been detected. The Process Image module 463 extracts parameters based on the detected cell features that describes aspects of the cell, such as cell morphology, which can be compared to the values from user's preset sorting criteria for subsequent determination of the sorting command (e.g., gating command).

Example implementations of the method 400 using the system 200 are described below for an example study demonstrating image-based cell sorting. In the example study, the imaging system 220 included a 100 mW 488-nm laser (e.g., iBeam-SMART, Toptica) that has an oval beam shape with Gaussian energy distribution, which is collimated, focused, and then expanded to illuminates an area of 100 μm (x-direction) by 250 μm (y-direction) to form the illumination area 215 on the microfluidic device 210. The fluorescence passing the miniature dichroic mirror with 500 nm cutoff wavelength (e.g., ThorLabs) and the scattering light were collected through a 50×, 0.55NA objective lens (e.g., Mituyoyo). The light intensity signal in each channel was acquired by a PMT (e.g., H9307-02, Hamamatsu).

Image reconstruction techniques, implemented by the Process Image module 463, for example, were used for spatial-to-temporal transformation of image data that can be mathematically formulated in the following:

$$S(t)=\int_{x,y} Cell(x,y-Mvt) \cdot F(x,y) \cdot I(x,y) dx\, dy \quad (1)$$

where S(t) is the measured PMT signal, Cell is the two-dimensional cell fluorescence or scattering intensity profile, F(x, y) is the characteristic function of the spatial filter, I(x, y) is the intensity profile of laser illumination, y is along the cell-travelling direction and x is along the transverse direction, and M is the magnification factor of the optical system pertaining to the flow cytometer. As the cell travels in the microfluidic channel at a speed v, the image projected onto the spatial filter, e.g., the example SF 224 shown in FIG. 2B, travels at an effective speed of Mv. In the simplest case to explain the principle and solving for Cell in Equation (1), one can choose F(x, y) to be a series of small slits (e.g., 100 μm by 50 μm rectangular slits) represented approximately in Equation (2) and I(x, y) to be a constant from a laser beam of uniform intensity (i.e., top-hat beam profile):

$$F(x,y)=\Sigma_{q=1}^{N} \delta(x-q) \cdot \delta(y-qL) \quad (2)$$

where x=1, 2, . . . , N is the number of row in the spatial filter, L is the distance between two slits that transmits fluorescence. As a result, for example, the cell image can be constructed from the following relation:

$$Cell(x,y) = S\left(\frac{xL-y}{v}\right) \quad (3)$$

An example image reconstruction technique that can be implemented by the Process Image module 463, for example, includes determining two variables: the number of sampling points in each peak, and the starting point of the time-domain image signal data (e.g., PMT signal) for the cell flowing. For example, since cells are not travelling at perfectly uniform speed, number of sampling points in each peak slightly changes; and since cell travelling speed as well as cell position in the image area slightly change (e.g., 20 μm by 20 μm image area set based on the example spatial filter), the starting point of the time-domain PMT readout also changes. In the example image reconstruction technique, m is referred to starting point of PMT readout, n is referred to number of points in each peak. Based on cell speed variation, for example, n ranges from 46 to 51. Accordingly, m ranges from 0 to 519-10n. The example image reconstruction technique sweeps m and n to assure the best combination to reconstruct cell image. Summation of intensities at starting point of each peak is calculated for every combination in the sweeping, for example. The combination with smallest summation is the right answer for image reconstruction. After m and n are calculated, they can be used to reconstruct both bright field and fluorescence images since signal recorded by both PMTs are synchronized. The example image reconstruction technique calculates values based on Equation (4), $$(m,n) = \left\{(m,n) \left| \min \sum_{i=0}^{10} \sum_{m=0}^{519-10n} FIFO_{PMT1}[m+i\times n]\right.\right\} \quad (4)$$

Figure 5B:
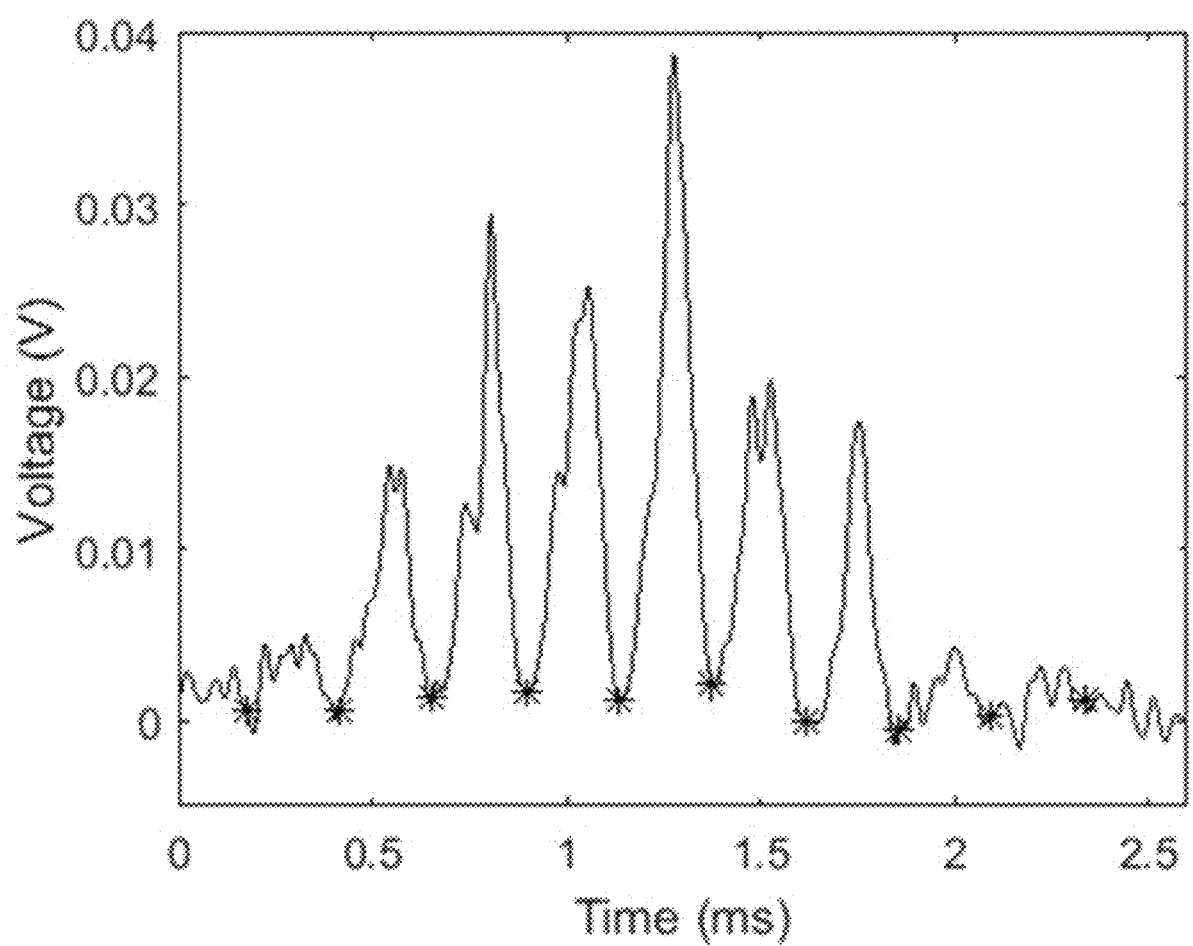
FIG. 5B shows a data plot depicting the results of an implementation of an example image reconstruction technique in accordance with the present technology.

FIG. 5B shows an example data plot depicting the results of an implementation of the image reconstruction technique, e.g., which shows example results of the search for the best combination of starting point and number of sampling points for each peak. The black "*" symbols shown in the data plot represent starting points of each peak found by the reconstruction algorithm.

Generally, with the spatial filter described above (e.g., spatial filter 224 of FIG. 2B) inserted at the image plane, fluorescence from different parts of the cell will pass different slits at different times. As a result, the waveform of the fluorescent signal from the PMT includes a sequence of patterns separated in time domain, and each section of the signal in the time domain corresponds to the fluorescent signal generated by each particular regime of the cell. After the light intensity profile over each slit is received, the cell image of the entire cell can be constructed by splicing all the profile together. In the example embodiment of the system 200 shown in FIGS. 2A-2C, the spatial filter contains ten 100 μm by 50 μm rectangular slits positioned in sequence. With a 50× objective lens (M=50), for example, the filter design allows construction of the fluorescent or scattering image of a travelling cell, e.g., no larger than 20 μm by 20 μm, using the algorithm including the Equation (3), which requires a minimum amount of computations and is suitable for high-throughput, real-time image-based cell classification and sorting. For example, using a 50×/0.55NA objective lens, 500 kHz sampling rate for acquiring PMT signal, and 0.2 m/s cell-travelling speed that is given by 12 μL/min sample flow rate and 120 μL/min sheath flow rate, the effective size of the pixel in y-direction is $$\frac{L}{(L/Mv) \times R} = \frac{Mv}{R} = 0.4 \mu m$$

which is smaller than the Rayleigh Criterion, thus resulting in a diffraction-limited resolution in y-direction. Here R is the sampling rate of PMT readout in this calculation. It is noted that other implementations parameters can be used, such as: cell-travelling at speed around 8 cm/s (e.g., given by the flow rate); image area set to be 20 μm by 20 μm (e.g., PMT readout based on fluorescence image of 10 peaks); sampling rate of 200 kSamples/s, such that each peak includes 50 sampling points.

For the example study, the design of spatial filter was drawn in AutoCAD and printed to a transparency mask at 20,000 dots per inch (dpi). A layer of negative photoresist (e.g., NR9-1500PY, Futurrex, Inc.) was spun at 3,000 rotations per minute (rpm) on a 6-inch glass wafer. The wafer was heated on a hot plate at 150° C. for 3 minutes then exposed to UV light (e.g., EVG620NT, EV Group) through the transparency mask. Post UV exposure, the wafer was baked at 100° C. for another 3 minutes before development in RD6 (e.g., Futurrex, Inc.) for 12 seconds. A film of 200 nm thick aluminum was sputtered onto the glass wafer. After metal lift-off, the patterns of the spatial filter were formed and the glass wafer was diced into 15 mm by 15 mm pieces. To help hold the spatial filter in the flow cytometer system, the spatial filter having ten 50 μm by 100 μm slits was mounted to a sample holder fabricated by 3D printing method.

For the example study, HEK293T human embryonic kidney cell samples were transfected with pEGFP-GR plasmids (e.g., Addgene). After continuous culturing for 3 days, 1 dexamethasone (e.g., Sigma-Aldrich) was added to the culture media. After incubation for 60 minutes, the HEK293T cells were harvested, fixed by 4% paraformaldehyde, washed and resuspended in 1× phosphate buffered saline (PBS). Before every imaging experiment, the suspension was diluted in PBS to a concentration of 200 cells/pt.

The example embodiment of the image-based cell sorting system 200 used in the example study included a spatial mask including 10 slits and utilized a cell flow speed of around 0.08 m/s. The image area was set to be 20 μm by 20 μm. In this design, the PMT signal from a cell's fluorescence appears to be 10 separated peaks, and number of sampling points of each peak is around 50. However, the speed of different cells is not perfectly uniform, so the number of sampling points for each cell slightly changes, and the starting point of each peak also needs to be determined. As such, the data processing algorithms were configured to account for such varying cell speeds, i.e., to search for the start point and number of sampling points for each peak within a certain range, so that the cell image can be successfully reconstructed. Based on the variations in cell flowing speed, the number of sampling points of each peak typically ranged from 46 to 51. So the total number of points in the cell image is from 460 to 510. For each cell, once the Particle Detection module 461 determined that there comes a cell, the PMT signal in a length of 520 sampling points was recorded. For example, to assure the best combination of staring point and number of sampling points for each peak, the algorithm sweeped the number of sampling points from 46 to 51 and start points of each peaks accordingly. For each combination in the sweeping, the sum of intensities at all starting points was calculated, and the combination with smallest summation was chosen as correct answer for image reconstruction.

Figure 6:
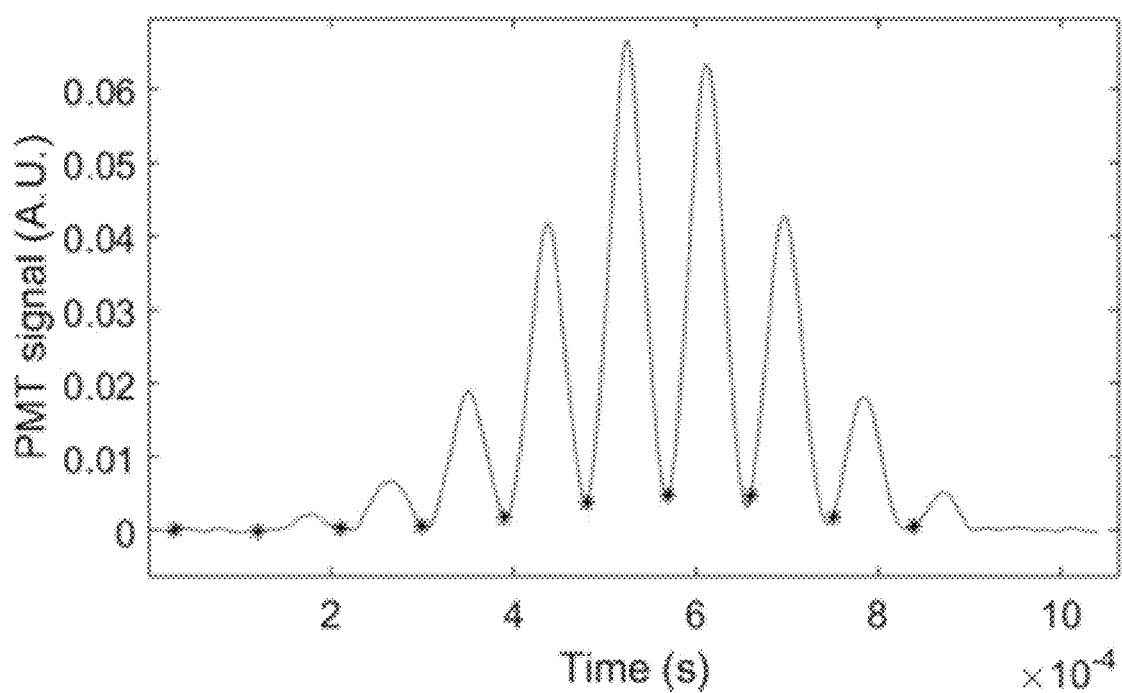
FIG. 6. shows a data plot depicting the fluorescence intensity signal for a cell based on an example image reconstruction.

FIG. 6. shows a data plot depicting the fluorescence intensity signal for a cell based on an example image reconstruction. The example result are indicative of searching for the best combination of staring point and number of sampling points for each peak.

Figure 7:
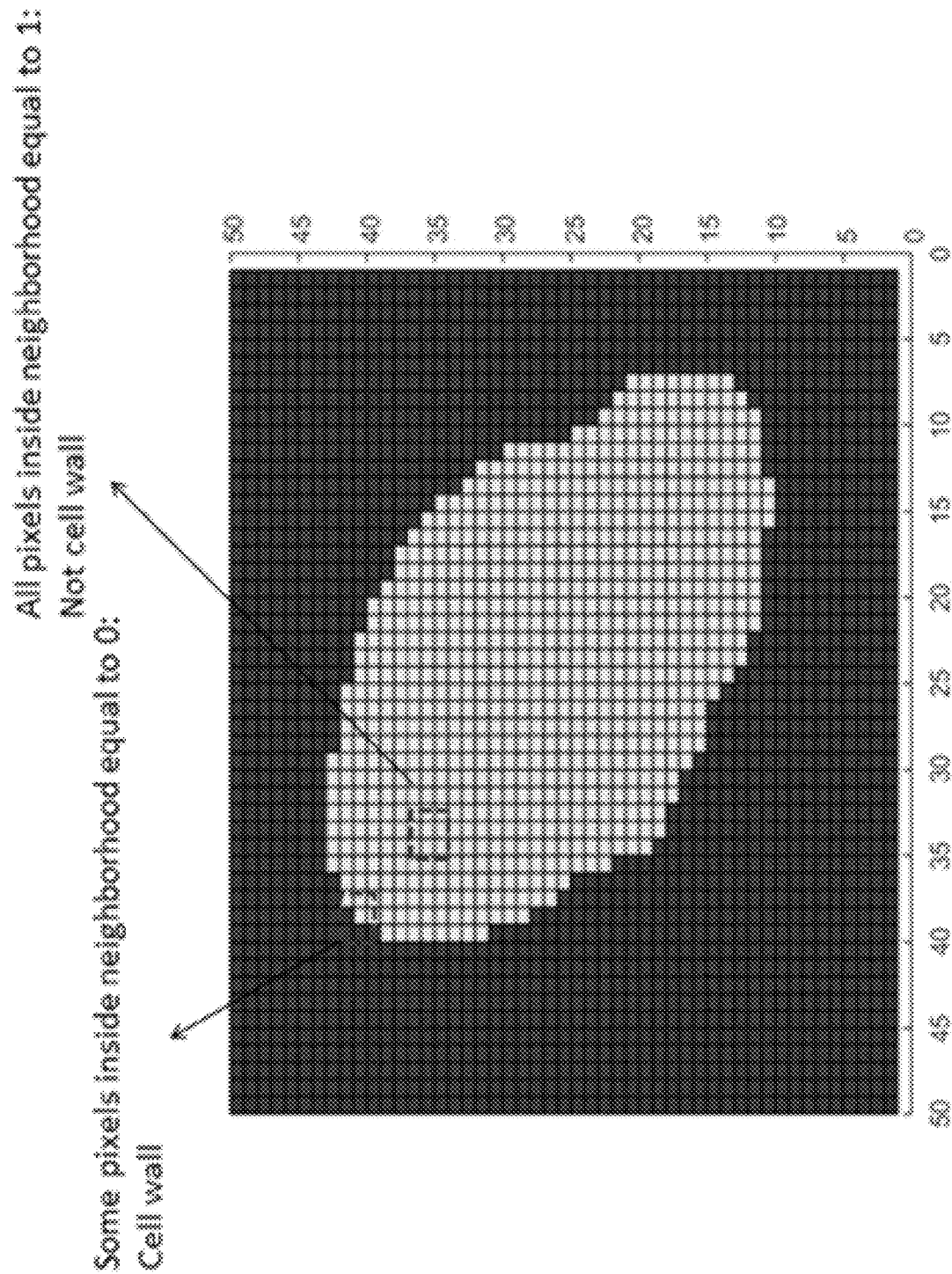
FIG. 7 shows an example of a reconstructed image of a cell.

FIG. 7 shows an example of a reconstructed image of a cell, e.g., in which the criteria was used the determine boundaries of a cell using fluorescent area to produce the image of the cell. For the open filter, which is an erosion followed by a dilation, a 3 by 3 neighborhood was used. In the step of cell wall or membrane detection, all the pixels in a binary cell image are scanned. For the pixels that have non-zero intensity, the example algorithm checked all nine pixels in its 3 by 3 neighborhood. By counting its neighboring pixels that have non-zero intensities, for example, if the counted number is larger than 0 and smaller than 8, this pixel was determined as a pixel on cell wall or membrane.

The example technique was implemented in at least in-part using an FPGA. Table 1 shows the round-up approximate latency results for each step in the example implementation of the data processing algorithm, in which the total latency is well within 3.3 ms. The example data processing algorithm is flexible to be implemented on multiple platforms, including in parallel. For example, utilizing the parallel processing power of graphics processing unit (GPU), the algorithm can also be implemented in GPU, by, for example, either the CUDA architecture by Nvidia or the OpenCL by AMD. The image soring algorithm has a much shorter runtime combining the parallel processing power of GPU, so the sorting throughput is further improved. Although the formulation of producing cell images is described in the form of example methods in this patent document, it is worth noticing that the algorithm can somewhat differ when using different spatial filter designs than the previously described 10-slit spatial mask. The overall working procedure of the system, however, remains the same.

Table 1 shows example data depicting the performance of modules in the example FPGA design, e.g., in which latencies is represented in time (ms).

TABLE 1

| | Latency (ms) |
|---|---|
| Low-pass filter | 0.6 |
| Reconstruct image | 0.4 |
| Resize image | 0.8 |
| Open filter | 0.9 |
| Detect cell wall | 0.4 |
| Extract morphology parameter(e.g., cell area) | 0.2 |
| Total | 3.3 |

Example sorting results from the example study are described. For example, to demonstrate the feasibility of the example real-time image-based cell sorter system, sorting tests on a mixture of cells possessing fluorescent cytoplasm and cells possessing fluorescent nucleus were performed. The normal human embryonic kidney cells, HEK293T cells, after transfection with pEGFP-GR plasmids, are expressing GFP that can be excited by 488 nm laser and has an emission peak at 509 nm in their cytoplasm. After 1 μM dexamethasone treatment for 1 hour, the fluorescence translocates to the cell nucleus from the cytoplasm region.

Figure 8A:
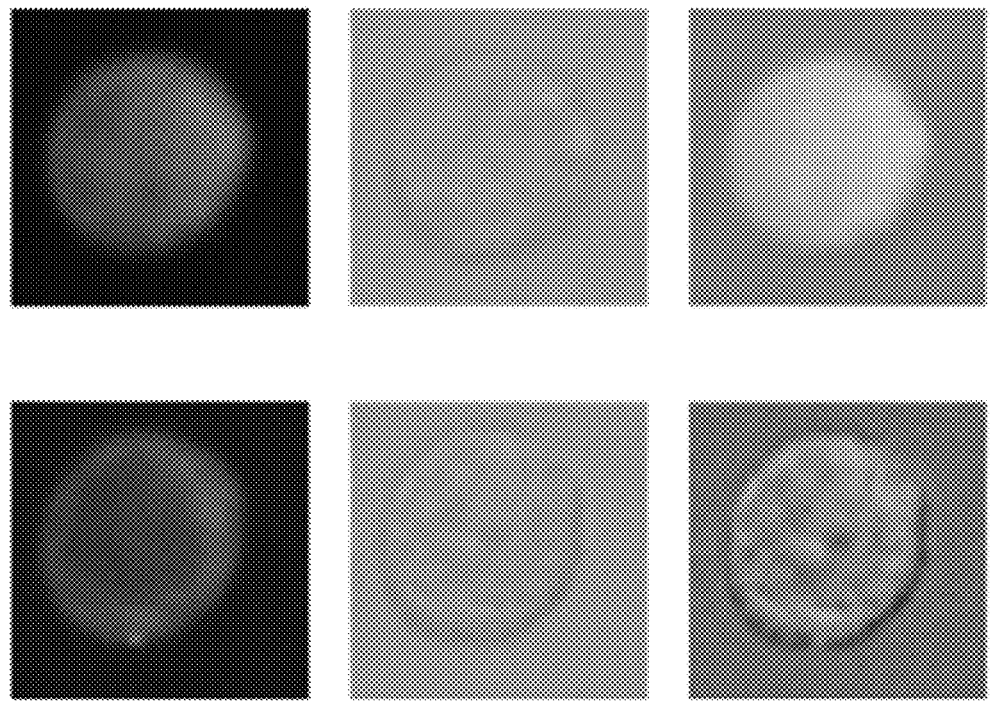
FIGS. 8A and 8B show example fluorescence microscope images of transfected but not drug treated cells and transfected and drug treated cells.
Figure 8B:
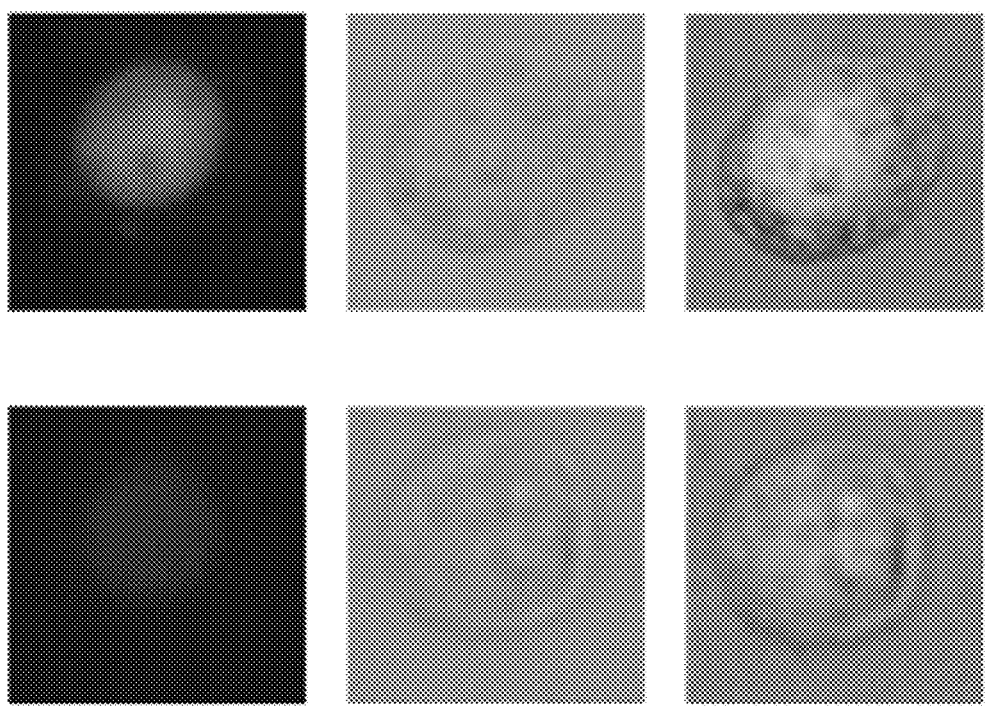

FIGS. 8A and 8B show example fluorescence microscope images of transfected but not drug treated cells (FIG. 8A) and transfected and drug treated cells (FIG. 8B). The images of FIGS. 8A and 8B represent an area of 20 μm by 20 μm. As shown by the example representative microscopic images of the transfected HEK293T cells without drug treatment (FIG. 8A), and those of treated cells (FIG. 8B), the drug treated cell image has smaller fluorescence area, even though the magnitude of the fluorescence intensity of both treated and untreated cells has a quite wide range.

As shown in the images of FIG. 8A and FIG. 8B, the left column of both rows shows the fluorescence image; the middle column shows the bright field image; and the right column shows the overlay images. Row 1 shows the sample cell with fluorescence distributed in cytoplasm (e.g., untreated with dexamethasone). Row 2 shows the sample cell with fluorescence distributed in nucleus (treated with dexamethasone). The cells are pEGFP-GR plasmids transfected HEK293T human embroynic kidney cells.

FIGS. 9A and 9B show fluorescence cell images taken by the image-based cell sorter system of transfected but not drug treated cells (FIG. 9A) and transfected and drug treated cells (FIG. 9B). The example images represent an area of 20 μm by 20 μm.

FIG. 10 shows a histogram of the example calculated fluorescence area of all events and of the sorted cells from the example study.

In the example study, the sorting criteria was preset to be 84 μm$^2$, so the drug treated cells are sorted by the example system. In this example study, due to the variation in cell size, nucleus size, and drug uptake by cells, it is possible that not all drug treated cells were sorted, but, the sorted cells all have fluorescence only in nucleus, so the purity is secured.

As demonstrated in the example implementation of an example embodiment of the system 200, the disclosed systems and techniques provide a high-throughput flow cytometer with cell sorting capabilities based on single cells' fluorescent and light scattering images. Realizing the cell image capture, process and sorting actuation in FPGA and/or GPU, the example results show that the afore-described design provides an overall processing latency at millisecond level.

Figure 11:
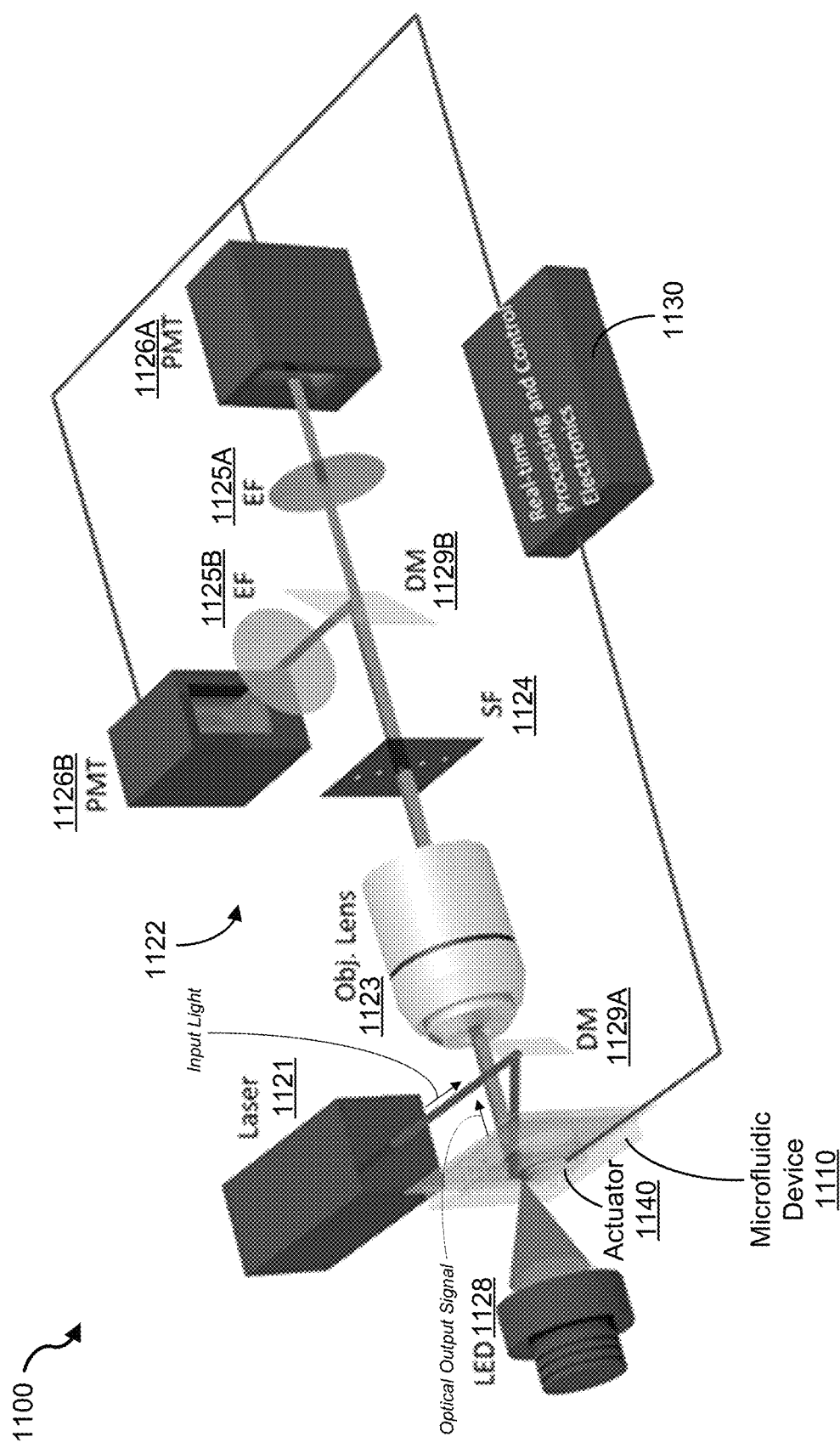
FIG. 11 shows a diagram of an example embodiment of an image-based cell sorting microfluidic system in accordance with the disclosed technology.

FIG. 11 shows a diagram of an image-based cell sorting microfluidic system 1100 in accordance with some embodiments of the image-based particle sorting system 100. The system 1100 includes a microfluidic device 1110 to flow particles through an optical interrogation channel for sorting, an imaging system 1120 to obtain image data of the particles in an illumination area of the interrogation channel, a data processing and control system 1130 to process the obtained image data in real time and determine a sorting command, and an actuator 1140 to gate the particles in the microfluidic device 210 based on the determined sorting command. In some implementations of the example system 1110, the microfluidic device 1110 and the actuator 1140 can include the microfluidic device 210 and the actuator 240, respectively.

The imaging system 1120 of the system 1100 includes a light source 1121, e.g., a laser, to provide an input or probe light at the illumination area of the microfluidic device 1110, and an optical imager 1122 to obtain images of the illuminated particles in the illumination area 215. The example optical imager 1122, as shown in FIG. 11, includes an objective lens 1123 (e.g., of a microscope or other optical imaging device) optically coupled to a spatial filter (SF) 1124, emission filters (EF) 1125A and 1125B, and photomultiplier tubes (PMT) 1126. In the example implementation shown in FIG. 11, the imaging system 1120 includes dichroic mirrors (DM) 1129A and 1129B, in which DM 1129A is arranged with the light source to direct the input light at the illumination area on the microfluidic device 1110 and DM 1129B is arranged with the optical imager 1122 in the optical path to direct a portion of the optical output signal to the PMT 1126B via the EF 1125B, while the undirected portion of the optical output signal proceeds to PMT 1126A via the EF 1125A. In some implementations, the light source 1121 (e.g., the laser) is configured to produce a fluorescent excitation signal that is incident upon the illumination area to cause a fluorescent emission by the particles. The optical imager 1122 captures the optical output fluorescent emission signal at the PMTs 1126A and 1126B, such that an image of the particle can be generated.

In example implementations of the system 1100, suspended single cells are hydrodynamically focused in the sorting channel of the microfluidic device 1110 by sheath flow, ensuring that the cells travel in the center of the fluidic channel at a uniform velocity. For example, both fluorescence emission and bright field signal can be detected by the multiple photomultiplier tubes, e.g., PMTs 1126A and 1126B. To accommodate the geometry of the microfluidic device, a 488 nm laser beam from the laser 1121 is introduced to the optical interrogation by 52-degree reflection by a miniature dichroic mirror 1129A positioned in front of a 50× objective lens (e.g., NA=0.55, working distance=13 mm). In some example embodiments, the system 1100 includes an optical light source 1128 (e.g., LED, such as the example 405 nm LED shown in FIG. 11), which can be placed at the opposite side of the channel to generate bright field images, and in which the light can be focused at the laser illumination position. The spatially coded filter, e.g., SF 1124, is inserted at the image plane in the detection path. To route desired emission band to their respective PMTs, the dichroic mirror 1129B splits the fluorescent and bright field light collected by the objective lens based on spectrum. The spatial resolution of the reconstructed image is determined by the filter. Resolution in x-(transverse) direction depends on the number of slits on the filter, and in y-(cell-travelling) direction depends on the sampling rate and cell flow speed.

In the example embodiment of the system 1100 shown in FIG. 11, the effective pixel size is 2 μm in x-direction and about 0.4 μm in y-direction.

Figure 12:
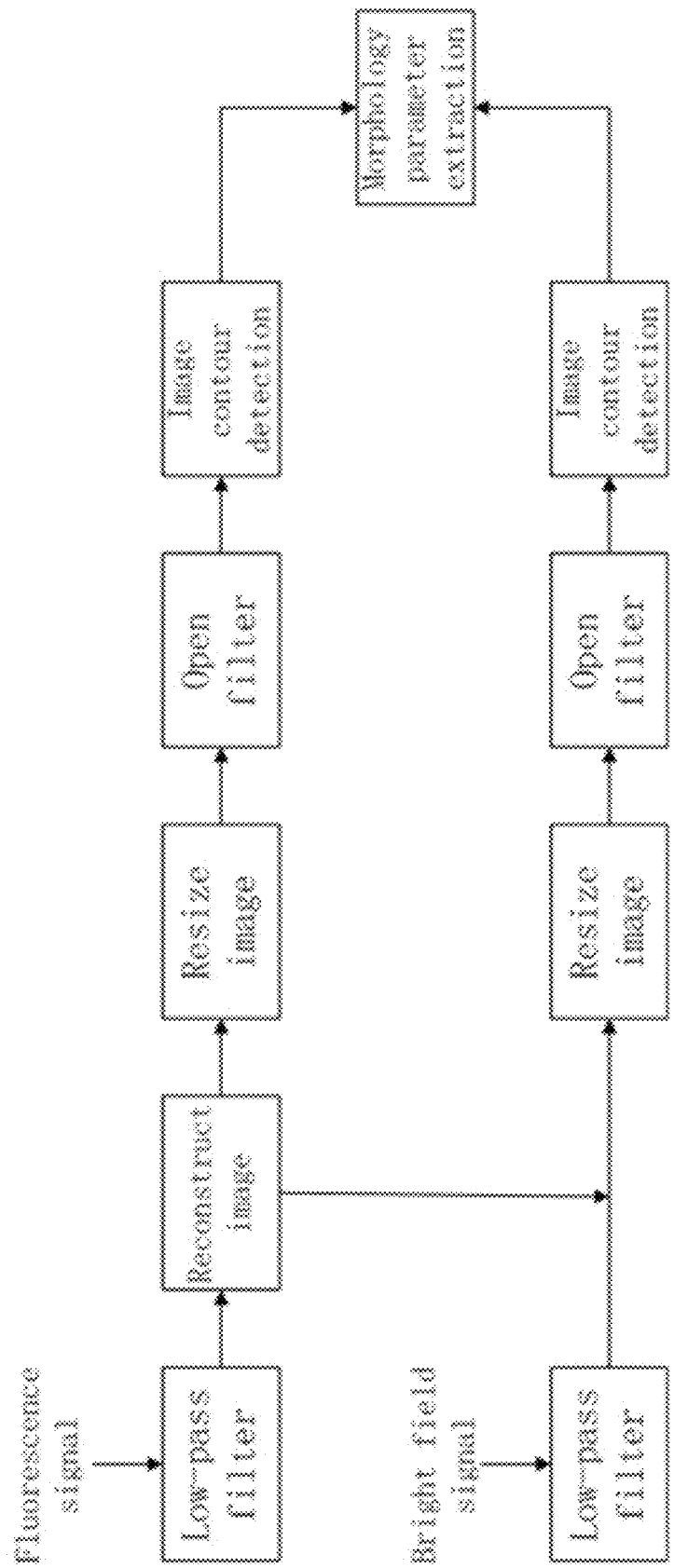
FIG. 12 shows a flow diagram of an example image processing implementation using the system shown in FIG. 11.

FIG. 12 shows a flow diagram of an example image processing implementation of an example embodiment of the system 1100. The data processing and control unit 1130 includes image processing modules to process fluorescence and bright field images captured by the imaging system 1120. An example image processing module, e.g., to implement aspects of the processes 420 and 430 of the method 400, for example, includes pre-processing the received image signal data from the multiple PMTs 1126A and 1126B. In such implementations, the pre-processing techniques can be performed after a detection of a cell is determined based on analysis of the received image signal data. In the example shown in FIG. 12, the PMT signals of fluorescence and bright field images are low-pass filtered to eliminate high frequency noise. In some implementations, for example, a 10th order hamming window is used for low-pass filtering. The example image processing module is configured to execute an image reconstruction algorithm to reconstruct both bright field and fluorescence image from time-domain PMT signal, e.g., into 2 dimensional images. Since bright field and fluorescence signals are generated by the same slits, they are synchronized by the data processing and control unit 1130. In some implementations, the image reconstruction algorithm is launched once for both bright field and fluorescence images. In some implementations, for example, reconstructed images are resized to 50×50 pixels. In some implementations, for example, grayscale images are converted to binary image based on intensity threshold. In some implementations, for example, binary images are filtered by open filter to eliminate spurious noise. In some implementations, for example, cell contour algorithm is launched to detect contour of both binary images. In some implementations, for example, morphology parameters are extracted based on processed images and sorting decision is made based on extracted parameters.

Figure 13A:
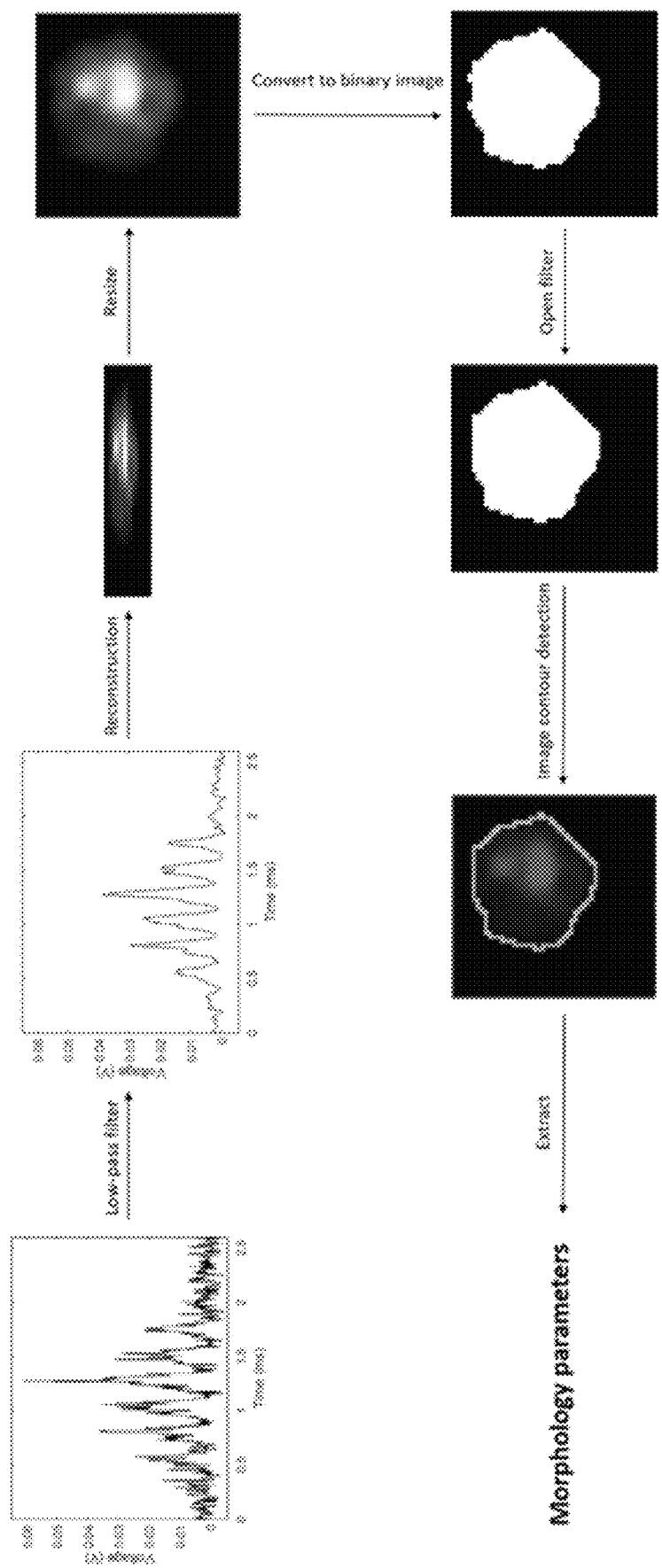
FIG. 13A shows a flow diagram depicting example data through the example image processing steps shown in FIG. 12.

FIG. 13A shows a flow diagram depicting example data through the example image processing steps shown in FIG. 12. In the diagram, the example image processing module produces a reconstructed and resized image of the detected individual cell including image contour features, which allow for cellular feature parameters such as cell morphology to be extracted from the produced image.

The algorithm is implemented on FPGA (National Instrument cRIO-9039). Table 2 shows example round-up approximate latency results for each step implemented by the example image processing module of the data processing and control unit 1130. Image processing for bright field and fluorescence images is executed in parallel. As shown in the table, the total latency of image processing is around 5.8 ms for this example.

Table 2 shows example data depicting the performance of modules in the example FPGA design for example implementations of the system 1100, e.g., in which latencies is represented in time (ms).

TABLE 2

|  | Latency (ms) |
| --- | --- |
| Low-pass filter | 0.8 |
| Reconstruction | 0.4 |
| Resize | 1.6 |

TABLE 2-continued

|  | Latency (ms) |
| --- | --- |
| Open filter | 2 |
| Cell contour detection | 1 |
| Total | 5.8 |

By decreasing the time latency of image processing, for example, the sorting throughput can be improved. With more powerful FPGA that has more computational resource, for example, the image processing module can be further paralleled to improve time latency. The example image processing algorithm can also be implemented on a GPU alternatively or additionally (e.g., in parallel processing with FPGA), e.g., such as by either the CUDA architecture by Nvidia or the OpenCL by AMD as examples. Because the example image processing algorithm is data-parallel, by utilizing the parallel processing power of GPU, the processing speed can be much accelerated, so that a much higher throughput can be achieved.

In some implementations, for example, the data processing and control unit 1130 can be configured to evaluate extracted morphology parameters, e.g., using Receiver Operating Characteristics (ROC). The top parameters are selected for real-time sorting.

In some implementations, a method for evaluating extracted morphology parameters using ROC technique includes the following. For example, the ROC technique can be applied to processed data from the image data obtained by flow cell samples through the system. For example, the cell images can be separated into two subsets, e.g., in some instances by manual identification. As an example, the two subsets can be translocated cells (e.g., a sorted group) and un-translocated cells (e.g., an unsorted group). For each cell, morphology parameters are extracted. The ROC technique can include generating a distribution for each parameter of both subsets. The technique includes generating the curve, which is the ROC curve for the distribution. The technique includes calculating the area under the curve (AUC), i.e., the integration of the curve. The technique includes evaluating how the parameters apply for the classification, e.g., the parameter with the larger AUC can be selected as the best suitable parameter for classification.

Figure 13B:
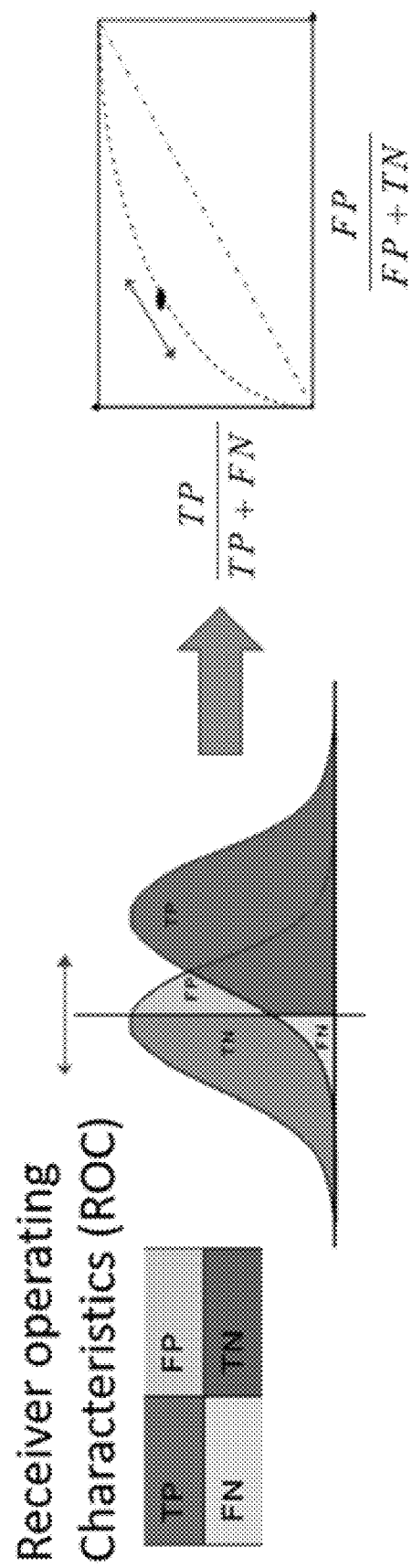
FIG. 13B shows an example distribution plot for subsets using an example Receiver Operating Characteristics (ROC) technique to evaluate extracted parameters such as cell morphology parameters.

FIG. 13B shows an example distribution plot for subsets using an example ROC technique to evaluate extracted parameters such as cell morphology parameters. In the example shown, the ROC includes TP, FP, FN, TN (TP is true positive, FP is false positive, FN is false negative, TN is true negative). The example curve represents the ROC curve. The parameter with larger AUC is better for the classification.

After parameters are selected for sorting, Support Vector Machine (SVM) can be used to generate nonlinear hyperplane as gating criterion using the selected parameters.

As an example, after the images are separated into subsets, e.g., such as the two example subsets, the selected parameters are calculated for each image. Each image corresponds to a n dimensional vector (n is the number of selected parameters). The example SVM technique is implemented to generate the boundary in n dimensional space that separates the subsets. For example, in making sorting decision, the selected parameters for each cell can be calculated, e.g., so as to know the cell is on which side of the boundary (e.g., which subsets does the cell belong to). Then, the sorting decision can be made.

Example extracted morphology parameters are shown in Table 3.

TABLE 3

| Fluorescence image | Bright field image | Fluorescence image + Bright field image |
| --- | --- | --- |
| Area | Area | Fluorescence area/bright field area (Area ratio) |
| Perimeter | Perimeter | Fluorescence perimeter/bright field perimeter (Perimeter ratio) |
| Shape factor (Area/Perimeter) | Shape factor (Area/Perimeter) | |
| Diameter (in x direction) | Diameter (in x direction) | |
| Diameter (in y direction) | Diameter (in y direction) | |

Example implementations of the method 400 using the system 1100 are described below for example studies demonstrating image-based cell sorting, including sorting based on protein translocation, sorting based on cell life cycle, and sorting based on number of beads bonded on the cell membrane of cells.

One example study included the sorting of pEGFP-GR plasmids translocated HEK-297T Human embryonic kidney cells, e.g., an implementation of sorting based on protein translocation. The example study demonstrated the capability to identify and sort pEGFP-GR plasmids translocated HEK-297T Human embryonic kidney cells from translocated and un-translocated mixtures. In the study, HEK-293T Human embryonic kidney cells were transfected with GR-GFP and separated into 2 plates. One plate of cells was untreated so the fluorescence stays in cytoplasm. The other plate of cells was treated with drug so the fluorescence migrates from cytoplasm to nucleus. Both types of cells were mixed and flow through the system, in which only translocated cells were sorted and collected based on implementation of the example method.

In the example study, the recorded PMT signal was processed by the data processing and control unit, e.g., executing the algorithms implemented by Matlab code. Based on the PMT signal, both fluorescence and bright field images of each cell were reconstructed, and morphology parameters of each cell were extracted and recorded. The extracted morphology parameters were used for supervised machine learning to generate criteria for real-time image-based cell sorting.

In the example study, the reconstructed cell images were separated into two subsets by manual identification. One subset of cells was un-translocated cells with fluorescence in cytoplasm, the other subset of cells was translocated cells with fluorescence in nucleus.

Figure 14A:
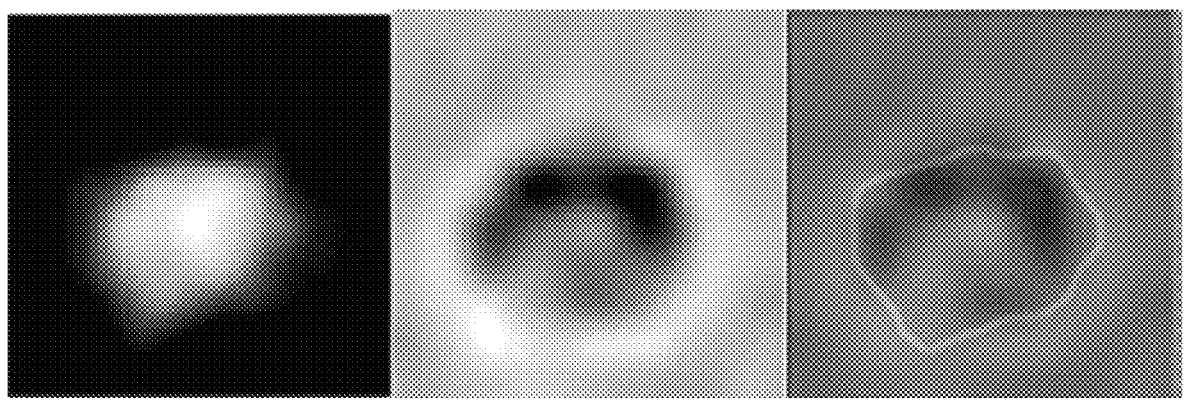
FIGS. 14A and 14B show cell images of un-translocated cells and translocated cells, respectively, captured by the example system and reconstructed by example image reconstruction techniques in accordance with the disclosed technology.
Figure 14B:
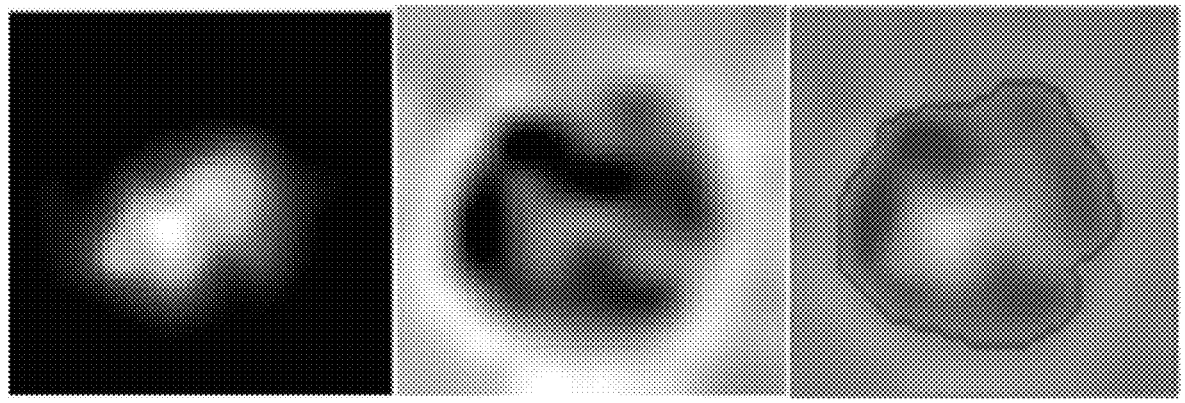

FIGS. 14A and 14B show cell images of un-translocated cells and translocated cells captured by the example system and reconstructed by the Matlab code. FIG. 14A shows images of un-translocated cells, and FIG. 14B shows images of translocated cells. In the images of FIGS. 14A and 14B, the image on the left is the fluorescence image of the cell, the image in the middle is bright field image of the cell, and the image on the right is overlay image with detected bright field contour.

In the example study, morphology parameters were evaluated based on the two annotated subsets using Receiver Operating Characteristics (ROC). The top 3 parameters were selected for real-time sorting. For example, the top 3 parameters in this case were Fluorescence area/Bright field area (e.g., area ratio), Fluorescence perimeter/Bright field perimeter (e.g., perimeter ratio), and Fluorescence area.

In the example study, sorting criteria using the three selected parameters was employed for real-time sorting of the cells in the system. A three dimensional nonlinear hyperplane separating the two cell subsets based on the selected top three parameters was formed by Support Vector Machine (SVM).

Figure 15:
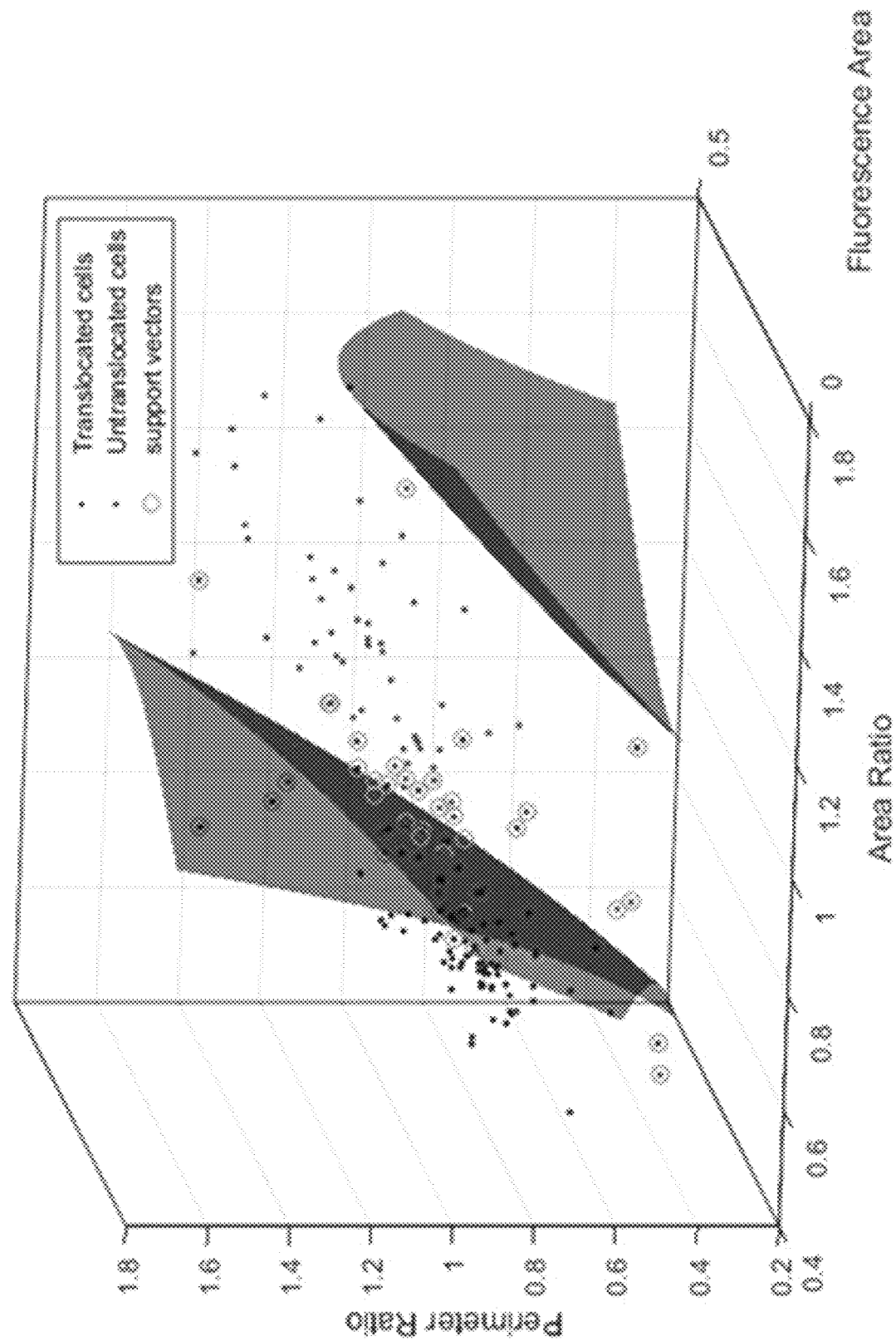
FIG. 15 shows an example of a hyperplane exhibiting separation of the two cell sets for implementations of cell sorting criteria.

FIG. 15 shows an example of a hyperplane exhibiting separation of the two cell sets (e.g., translocated cells and un-translocated cells) for implementations of the sorting criteria.

The two types of cells were mixed 50:50 and diluted to 200/μL using phosphate buffered saline (PBS). The mixed sample were flowed through the example image-based sorting system and sorted based on the real-time module. The cells traveled at a speed of 8 cm/s that is given by 6 μL/min sample flow rate and 60 μL/min sheath flow rate. The example imager included a microscope with a CCD camera that was used to capture both fluorescence and bright field images of collected cells.

Figure 16A:
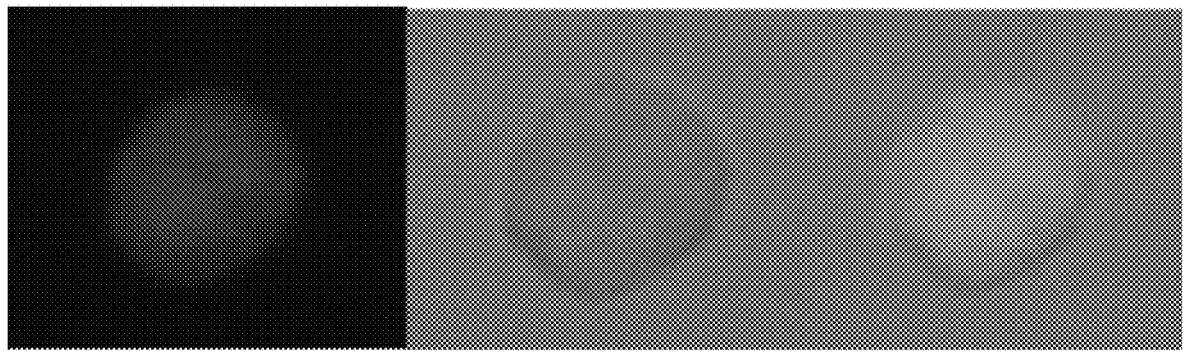
FIGS. 16A and 16B show cell images of un-translocated cells and translocated cells, respectively, captured by the example system, via a microscope.
Figure 16B:

FIGS. 16A and 16B show cell images of un-translocated cells and translocated cells captured by the example system, via the microscope. FIG. 16A shows the microscope images of un-translocated cells, and FIG. 16B shows the microscope images of translocated cells. In the images of FIGS. 16A and 16B, the image on the left is the fluorescence image of the cell imaged by the microscope, the image in the middle is bright field image of the cell by the microscope, and the image on the right is overlay image.

One example study included the sorting of MDCK Madin-Darby Canine Kidney Epithelial cells at G2/M stage, e.g., an implementation of sorting based on cell life cycle. In the study, MDCK Madin-Darby Canine Kidney Epithelial cells were fixed and cell nucleus was stained with Propidium Iodide (PI). Fixed and stained MDCK cells were flowed through the example image-based sorting system, and only cells at G2/M phase were sorted and collected.

Similar to the example study for sorting based on protein translocation, the recorded PMT signals were processed to reconstruct cell images and extract morphology parameters. The reconstructed cell images were separated into two subsets by manual identification. One subset of cells was at G1 phase. At G1 phase, constituents of nucleus are confined in nucleus membrane. The other subset of cells was at G2/M phase. At G2/M phase, nucleus membrane breaks down and constituents of nucleus are distributed within the cell.

Figure 17A:
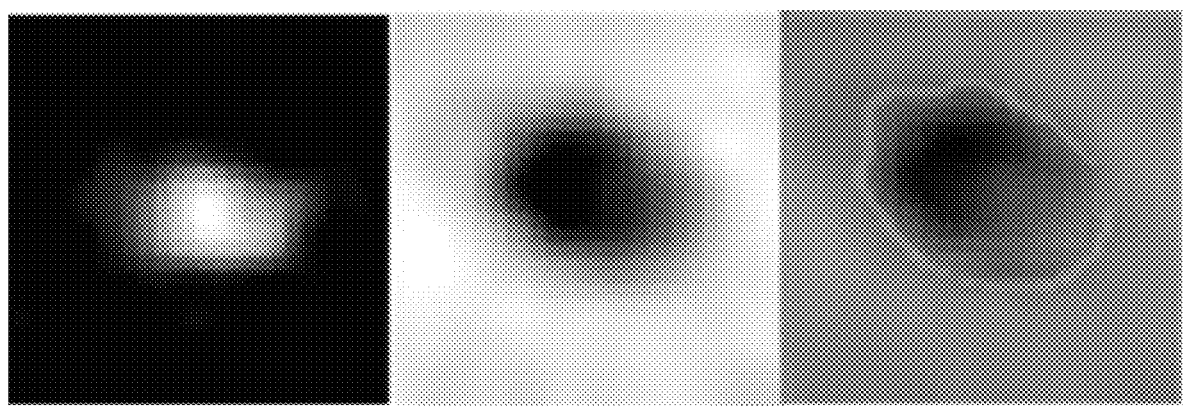
FIGS. 17A and 17B show cell images of G1 phase cells and G2/M phase cells, respectively, captured by the example system and reconstructed by example image reconstruction techniques in accordance with the disclosed technology.
Figure 17B:
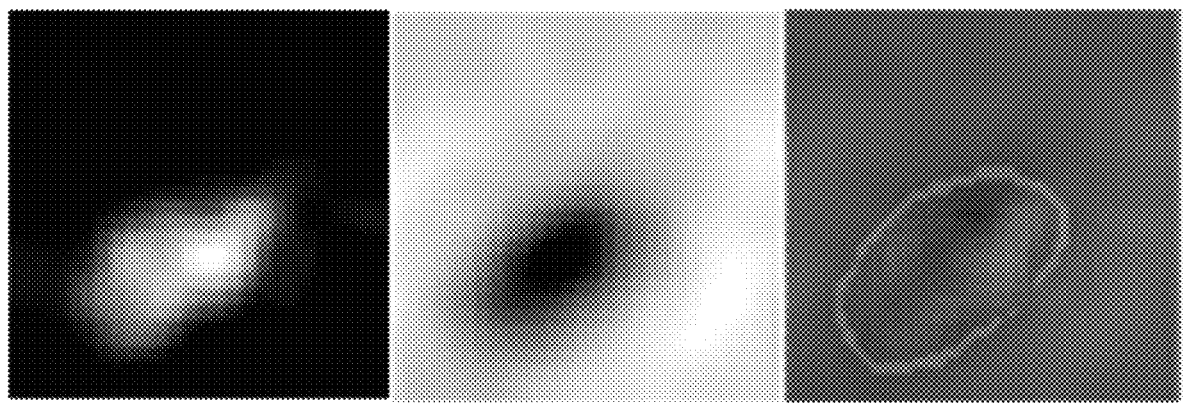

FIGS. 17A and 17B show cell images of G1 phase cells and G2/M phase cells captured by the example system and reconstructed by the Matlab code. FIG. 17A shows images of cells at G1 phase, and FIG. 17B shows images of cells at G2/M phase. In the images of FIGS. 17A and 17B, the image on the left is the fluorescence image of the cell, the image in the middle is bright field image of the cell, and the image on the right is overlay image with detected bright field contour.

Similar to the example study for sorting based on protein translocation, morphology parameters were evaluated using ROC, and a three dimensional nonlinear hyperplane was formed by SVM. The top 3 morphology parameters are Fluorescence area/Bright field area (e.g., area ratio), Fluorescence area and Fluorescence perimeter/Bright field perimeter (e.g., perimeter ratio).

Figure 18:
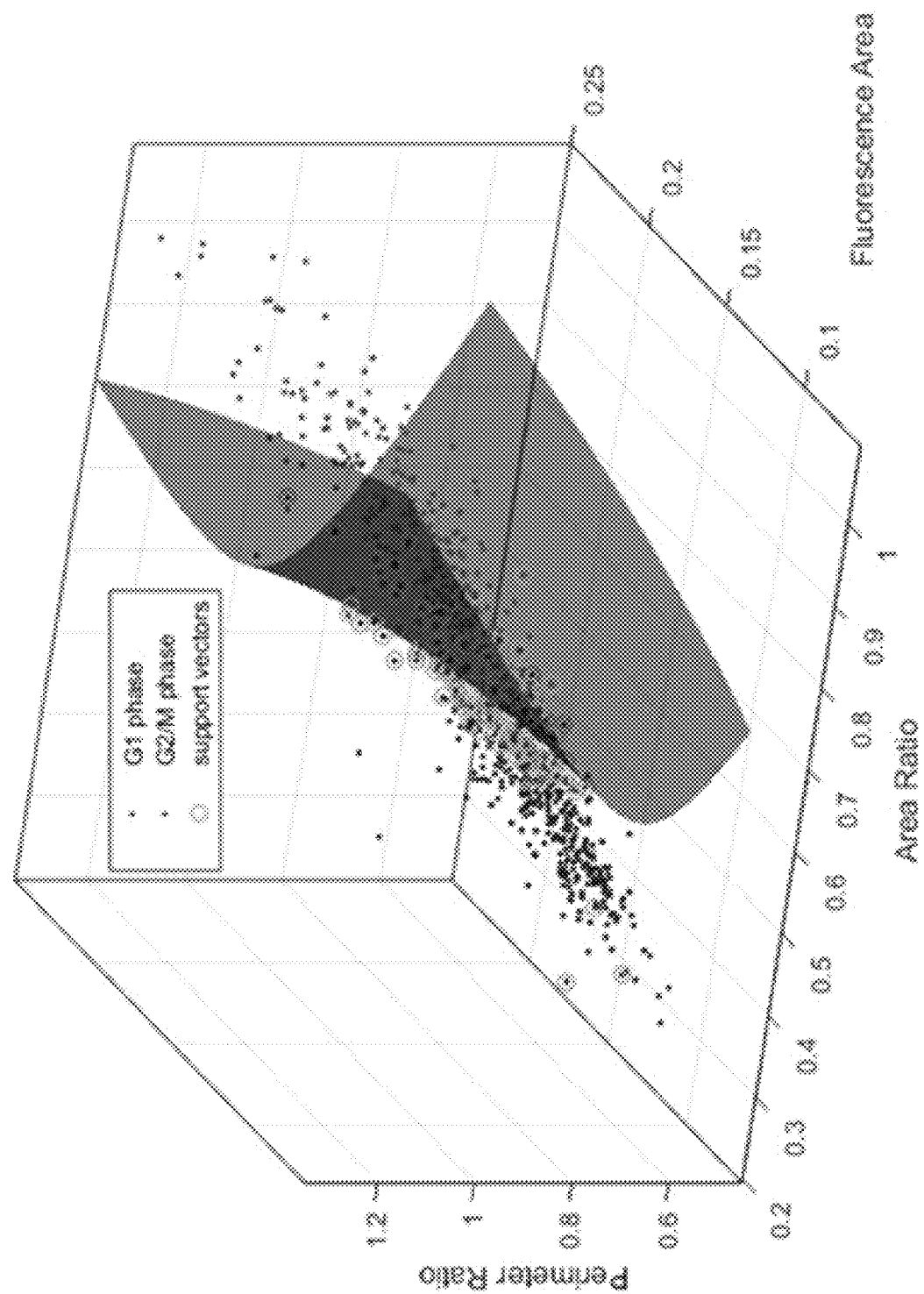
FIG. 18 shows an example of a hyperplane exhibiting separation of the two cell sets for implementations of cell sorting criteria.

FIG. 18 shows an example of a hyperplane exhibiting separation of the two cell sets (e.g., cells at G1 phase and cells at G2/M) for implementations of the sorting criteria.

MDCK cells were diluted to 200/μL using PBS. The sample was flowed through the example system and sorted based on the real-time module. The cells traveled at speed 8 cm/s that is given by 6 μL/min sample flow rate and 60 μL/min sheath flow rate. The example imager included a microscope with a CCD camera that was used to capture both fluorescence and bright field images of collected cells.

Figure 19A:
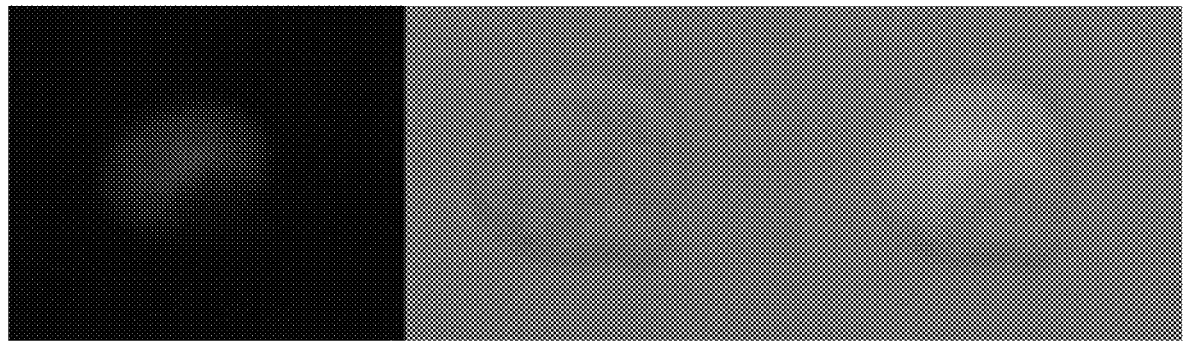
FIGS. 19A and 19B show cell images of G1 phase cells and G2/M cells, respectively, captured by the example system and reconstructed by example image reconstruction techniques in accordance with the disclosed technology.
Figure 19B:
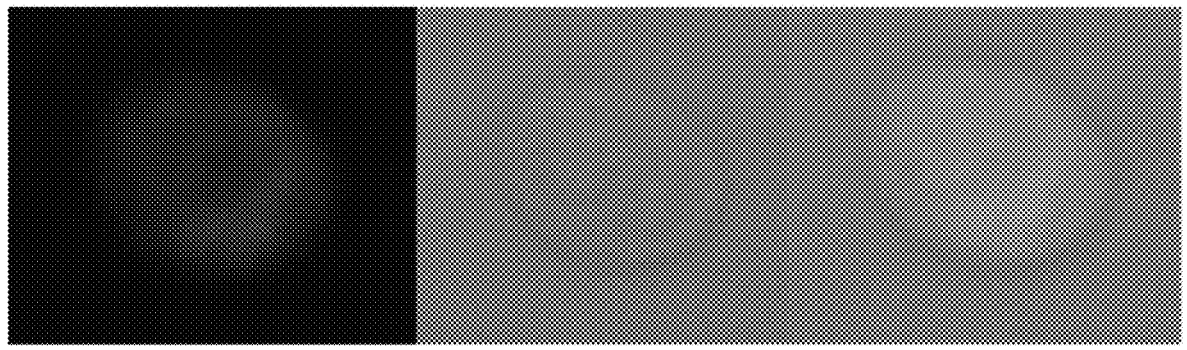

FIGS. 19A and 19B show cell images of G1 phase cells and G2/M cells captured by the example system, via the microscope. FIG. 19A shows the microscope images of cells at phase G1, and FIG. 19B shows the microscope images of cells at G2/M phase. In the images of FIGS. 19A and 19B, the image on the left is the fluorescence image of the cell imaged by the microscope, the image in the middle is bright field image of the cell by the microscope, and the image on the right is overlay image.

One example study included the sorting of HEK-297T Human embryonic kidney cells based on number of beads bond with the cells, e.g., an implementation of sorting based on number of beads bonded on the cell membrane of cells. In the study, HEK-297T Human embryonic kidney cells were bonded with fluorescence beads and stained with USE kits. The fluorescence of cells was at 520 nm and fluorescence of beads is at 645 nm. Fluorescence signals at two wavelengths at routed by dichroic mirror and detected by two PMT's. Cells were sorted based on number of bonded beads. The image processing module for this application was modified accordingly to process the images.

Figure 20:
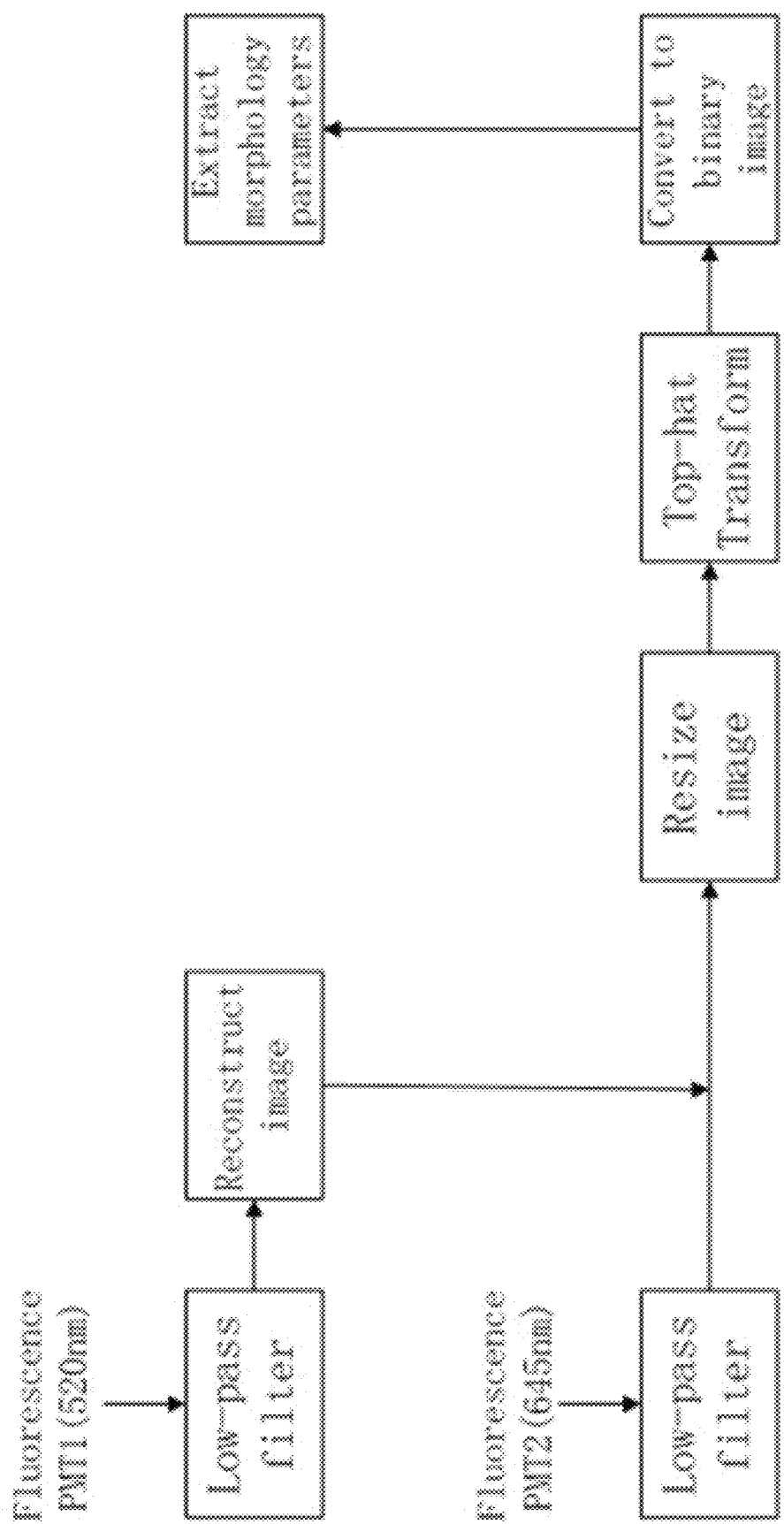
FIG. 20 shows a flow diagram of an example image processing implementation for sorting based on number of beads bonded on the cell membrane of cells implemented by the system shown in FIG. 11.

FIG. 20 shows a flow diagram of an example image processing implementation for sorting based on number of beads bonded on the cell membrane of cells implemented by an example embodiment of the system 1100. The data processing and control unit 1130 includes image processing modules to process fluorescence and bright field images captured by the imaging system 1120. An example image processing module, e.g., to implement aspects of the processes 420 and 430 of the method 400, for example, includes pre-processing the received image signal data from the multiple PMTs 1126A and 1126B. As shown in the diagram, for example, the fluorescence signals at both wavelengths were low-pass filtered. The fluorescence signal at 520 nm was used for image reconstruction in this example study. The reconstructed beads image was resized to 50×50 pixels. The top-hat transform was implemented to remove image background. In this example implementation, a 7×7 pixels neighborhood was used for top-hat transform. In this example implementation, a grayscale image was converted to binary image. Morphology parameters were extracted. In this example, image area was chosen as sorting criterion as beads have relatively uniform size. In some implementations, for example, morphology parameters are extracted based on processed images and sorting decision is made based on extracted parameters.

Table 4 shows the total latency of real-time image processing is 7.8 ms. The example modules were implemented in using FPGA for beads counting.

TABLE 4

|  | Latency (ms) |
| --- | --- |
| Low-pass filter | 0.8 |
| Reconstruction | 0.4 |
| Resize | 1.6 |
| Top-hat transform | 5 |
| Total | 7.8 |

Figure 21:
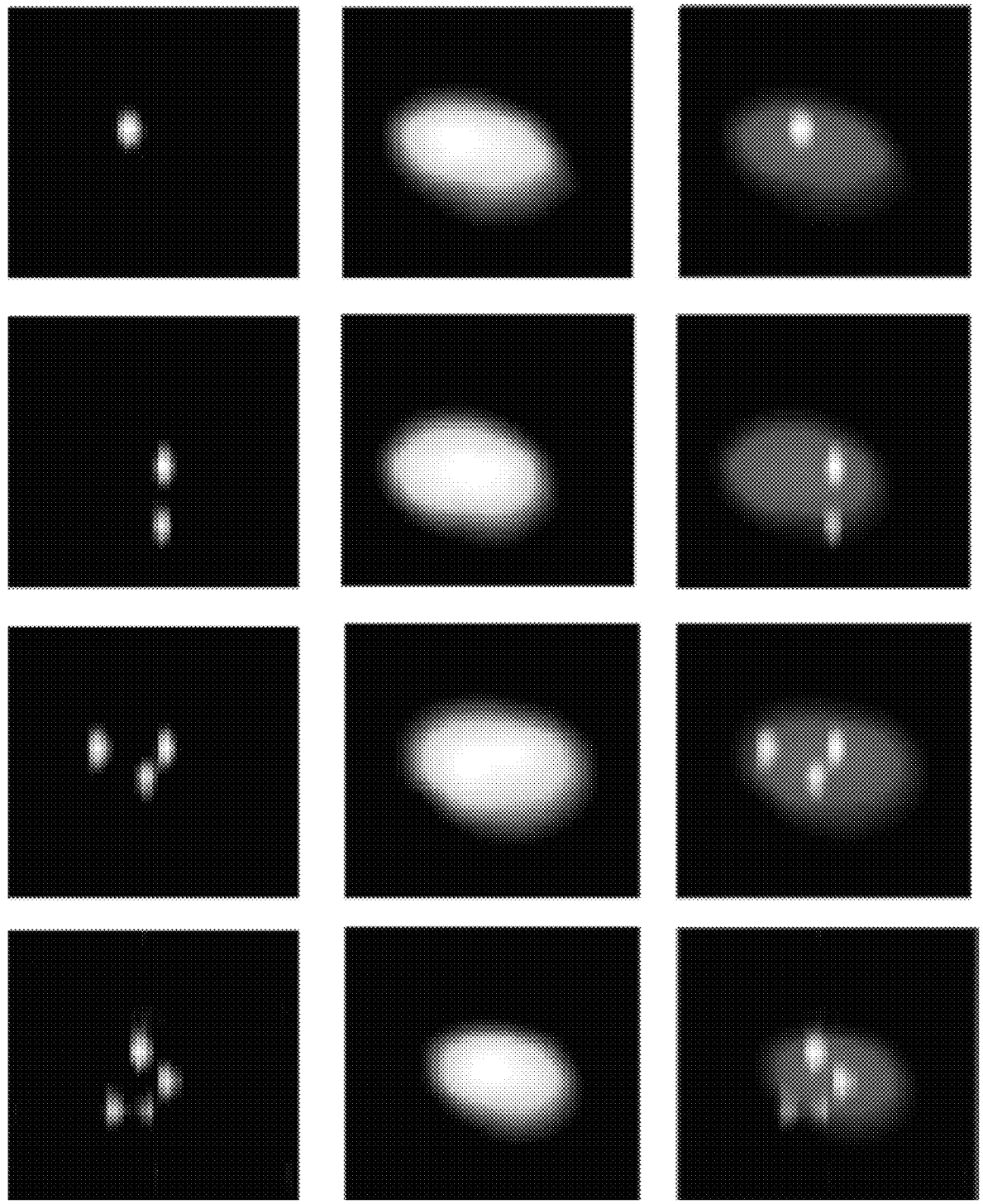
FIG. 21 shows examples of grayscale cell images processed by an example image processing module with different number of beads.

FIG. 21 shows examples of grayscale cell images processed by the image processing module with different number of beads. As shown in FIG. 21, the images in the left column are fluorescence images of beads, the images in the middle column are fluorescence image of the cells, and the images in the right column are overlay images.

Figure 22:
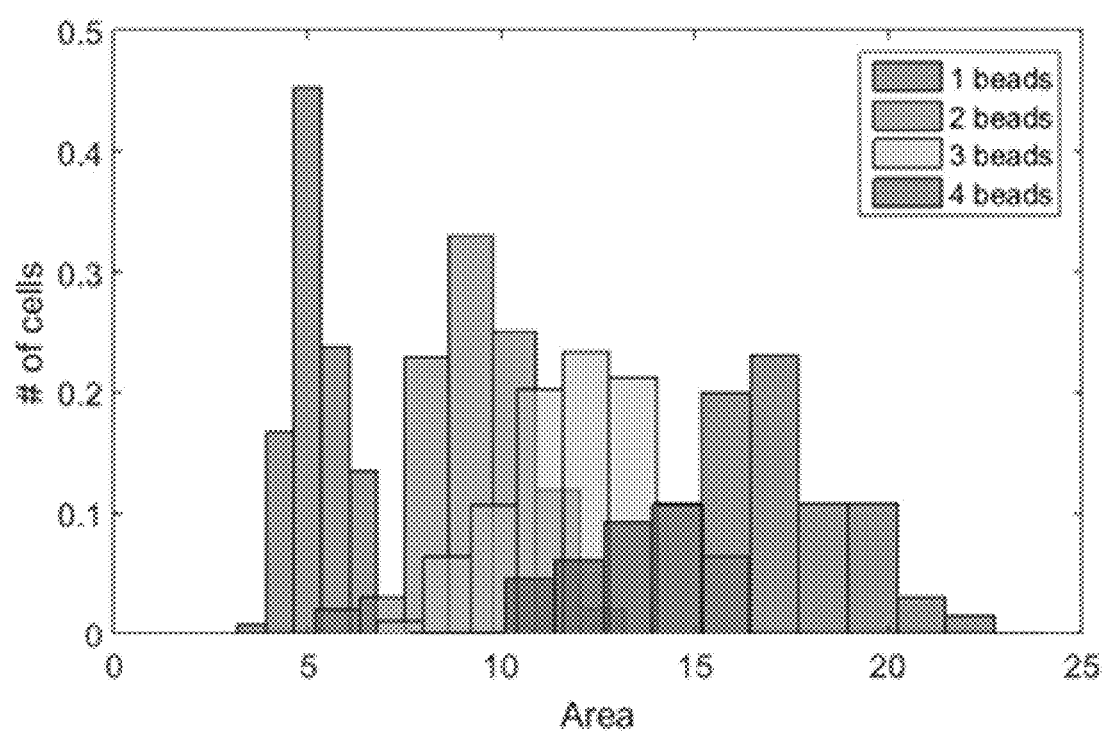
FIG. 22 shows a histogram of beads image area for different number of beads.

FIG. 22 shows a histogram of beads image area for different number of beads.

EXAMPLES

The following examples are illustrative of several embodiments in accordance with the present technology. Other exemplary embodiments of the present technology may be presented prior to the following listed examples, or after the following listed examples.

In some embodiments in accordance with the present technology (example A1), an image-based particle sorting system includes a particle flow device structured to include a substrate, a channel formed on the substrate operable to flow particles along a flow direction to a first region of the channel, and two or more output paths branching from the channel at a second region proximate to the first region in the channel; an imaging system interfaced with the particle flow device and operable to obtain image data associated with a particle when the particle is in the first region during flow through the channel; a data processing and control unit in communication with the imaging system, the data processing and control unit including a processor configured to process the image data obtained by the imaging system to determine one or more properties associated with the particle from the processed image data and to produce a control command based on a comparison of the determined one or more properties with a sorting criteria; and an actuator operatively coupled to the particle flow device and in communication with the actuator, the actuator operable to direct the particle into an output path of the two or more output paths based on to the control command, in which the system is operable to sort each of the particles during flow in the channel within a time frame of 15 ms or less from a first time of image capture by the imaging system to a second time of particle direction by the actuator.

Example A2 includes the system of example A1, in which the particle flow device includes a microfluidic device or a flow cell integrated with the actuator on the substrate of the microfluidic device or the flow cell.

Example A3 includes the system of example A1, in which the actuator includes a piezoelectric actuator coupled to the substrate and operable to produce a deflection to cause the particle to move in a direction in the second region that directs the particle along a trajectory to the output path of the two or more output paths.

Example A4 includes the system of example A1, in which the imaging system includes one or more light sources to provide an input light at the first region of the particle flow device, and an optical imager to capture the image data from the particles illuminated by the input light in the first region.

Example A5 includes the system of example A4, in which the one or more light sources include at least one of a laser or a light emitting diode (LED).

Example A6 includes the system of example A4, in which the optical imager includes an objective lens of a microscope optically coupled to a spatial filter, an emission filter, and a photomultiplier tube.

Example A7 includes the system of example A6, in which the optical imager further includes one or more light guide elements to direct the input light at the first region, to direct light emitted or scattered by the particle to an optical element of the optical imager, or both.

Example A8 includes the system of example A7, in which the light guide element includes a dichroic mirror.

Example A9 includes the system of example A6, in which the optical imager includes two or more photomultiplier tubes to generate two or more corresponding signals based on two or more bands or types of light emitted or scattered by the particle.

Example A10 includes the system of example A1, in which the processor of the data processing and control unit includes a field-programmable gate-array (FPGA), a graphics processing unit (GPU), or a FPGA and a GPU in parallel.

Example A11 includes the system of example A1, in which the data processing and control unit is configured to receive the image data (e.g., including time domain signal data) associated with the particle imaged in the first region on the particle flow device, process the image data to produce an image data set representative of an image of the particle, analyze the produced image data set to extract one or more parameters from the image data set associated with the one or more properties of the particle, and determine the control command based on the comparison of the extracted one or more parameters with one or more thresholds of the sorting criteria.

Example A12 includes the system of example A11, in which the data processing and control unit is configured to process the image data to produce the image data set by filtering the image data, reconstructing a first image based on the filtered data, and resizing the reconstructed first image to produce a second image, in which the second image includes binary image data.

Example A13 includes the system of example A1, in which the particles include cells, and the one or more properties associated with the cell includes an amount or a size of a features of or on the cell, one or more sub-particles attached to the cell, or a particular morphology of the cell or portion of the cell.

Example A14 includes the system of example A1, in which the particles include cells, and the sorting criteria includes a cell contour, a cell size, a cell shape, a nucleus size, a nucleus shape, a fluorescent pattern, or a fluorescent color distribution.

Example A15 includes the system of example A1, in which the particles include cells, and the one or more properties associated with the cell includes a physiological property of the cell including a cell life cycle phase, an expression or localization of a protein by the cell, a damage to the cell, or an engulfment of a substance or sub-particle by the cell.

In some embodiments in accordance with the present technology (example A16), a method for image-based sorting of a particle includes obtaining image signal data of a particle flowing through a channel of a particle flow device; processing the image signal data to produce an image data set representative of an image of the particle; analyzing the produced image data set to identify one or more properties of the particle from the processed image data; producing a control command by evaluating the one or more identified properties with a sorting criteria; and directing the particle into one of a plurality of output paths of the particle flow device based on to the control command.

Example A17 includes the method of example A16, in which the obtaining, the processing, the analyzing, the producing and the directing operations are performed during the particle's flow in the channel within a time frame of 15 ms or less.

Example A18 includes the method of example A16, in which the producing the control command includes extracting one or more parameters from the processed image data of the particle associated with the identified one or more properties of the particle, and comparing the extracted one or more parameters from the image with one or more threshold values of the sorting criteria.

Example A19 includes the method of example A16, in which the processing the image signal data to produce the image data set includes filtering the image signal data; reconstructing a first image based on the filtered data; and resizing the reconstructed first image to produce a second image, in which the second image includes binary image data.

Example A20 includes the method of example A16, in which the processing the image signal data includes detecting the presence of the particle prior to producing the image data set representative of the image of the particle.

Example A21 includes the method of example A20, in which the detecting the presence of the particle includes calculating a brightness value associated with a magnitude of signal intensity of the image signal data; evaluating that the brightness value with a first threshold; determining a derivative value when the brightness value exceeds the first threshold; evaluating that the derivative value exceeds a second threshold; determining that the derivative value exceeds the second threshold.

Example A22 includes the method of example A16, in which the particle flowing through the channel is a cell, and the one or more properties associated with the cell includes an amount or a size of a features of or on the cell, one or more sub-particles attached to the cell, or a particular morphology of the cell or portion of the cell.

Example A23 includes the method of example A16, in which the particle flowing through the channel is a cell, and the sorting criteria includes a cell contour, a cell size, a cell shape, a nucleus size, a nucleus shape, a fluorescent pattern, or a fluorescent color distribution.

Example A24 includes the method of example A16, in which the particle flowing through the channel is a cell, and the one or more properties associated with the cell includes a physiological property of the cell including a cell life cycle phase, an expression or localization of a protein by the cell, a damage to the cell, or an engulfment of a substance or sub-particle by the cell.

In some embodiments in accordance with the present technology (example A25), a method for obtaining image based sorting of cells in a flow cytometry device includes recording an image; analyzing the recorded image to determine whether or not a cell is detected; when a determination that a cell is detected is determined, processing the image; and based on the results of the processing, making a determination whether to trigger an actuator in the flow cytometry device.

Example A26 includes the method of example A25, in which upon a determination that a cell is not detected, resuming the recording of the image.

Example A27 includes the method of example A25, in which determining whether or not a cell is detected includes calculating a brightness value; determining whether or not the brightness value exceeds a first threshold; when a determination that the brightness value exceeds the first threshold is made, determining a derivative value; determining whether or not the derivative value exceeds a second threshold; and when a determination that the derivative value exceeds the second threshold is made, providing an indication that a cell is detected, in which when no determination that the brightness value exceeds the first threshold or the derivative value exceeds the second threshold, providing an indication that a cell is not detected or providing no indication.

In some embodiments in accordance with the present technology (example A28), a particle imaging and flow system includes a particle flow device structured to include a substrate, a channel formed on the substrate operable to flow particles along a flow direction to a first region of the channel; an imaging system interfaced with the particle flow device and operable to obtain image data associated with a particle when the particle is in the first region during flow through the channel; and a data processing and control unit in communication with the imaging system, the data processing and control unit configured to process the image data obtained by the imaging system and to determine one or more properties associated with the particle to produce an analyzed data set including data indicative of the determined one or more properties of the particle.

Example A29 includes the system of example A28, in which the particle flow device includes a microfluidic device or a flow cell.

Example A30 includes the system of example A28, in which the imaging system includes one or more light sources to provide an input light at the first region of the particle flow device, and an optical imager to capture the image data from the particles illuminated by the input light in the first region.

Example A31 includes the system of example A30, in which the one or more light sources include at least one of a laser or a light emitting diode (LED).

Example A32 includes the system of example A30, in which the optical imager includes an objective lens of a microscope optically coupled to a spatial filter, an emission filter, and a photomultiplier tube.

Example A33 includes the system of example A32, in which the optical imager further includes one or more light guide elements (e.g., dichroic mirror) to direct the input light at the first region, to direct light emitted or scattered by the particle to an optical element of the optical imager, or both.

Example A34 includes the system of example A30, in which the optical imager includes two or more photomultiplier tubes to generate two or more corresponding signals based on two or more bands or types of light emitted or scattered by the particle.

Example A35 includes the system of example A28, in which the processor of the data processing and control unit includes a field-programmable gate-array (FPGA), a graphics processing unit (GPU), or a FPGA and a GPU in parallel.

Example A36 includes the system of example A28, in which the data processing and control unit is configured to receive the image data (e.g., including time domain signal data) associated with the particle imaged in the first region on the particle flow device, process the image data to produce an image data set representative of an image of the particle, and analyze the produced image data set to extract one or more parameters from the image data set associated with the one or more properties of the particle.

Example A37 includes the system of example A36, in which the data processing and control unit is configured to process the image data to produce the image data set by filtering the image data, reconstructing a first image based on the filtered data, and resizing the reconstructed first image to produce a second image, in which the second image includes binary image data.

Example A38 includes the system of example A28, in which the particles include cells, and the one or more properties associated with the cell includes an amount or a size of a features of or on the cell, one or more sub-particles attached to the cell, or a particular morphology of the cell or portion of the cell.

Example A39 includes the system of example A28, in which the particles include cells, and the sorting criteria includes a cell contour, a cell size, a cell shape, a nucleus size, a nucleus shape, a fluorescent pattern, or a fluorescent color distribution.

Example A40 includes the system of example A28, in which the particles include cells, and the one or more properties associated with the cell includes a physiological property of the cell including a cell life cycle phase, an expression or localization of a protein by the cell, a damage to the cell, or an engulfment of a substance or sub-particle by the cell.

In some embodiments in accordance with the present technology (example B1), a system includes a microfluidic device integrated with on-chip sorting actuator; a high-speed and high-sensitivity imaging optical system; and a real-time cell image processing and sorting control electronic system.

Example B2 includes the system of example B1, in which the a real-time cell image processing and sorting control electronic system is configured to allow one or more user-defined gating criteria.

Example B3 includes the system of example B1, in which the one or more user-defined gating criteria includes a cell contour, a cell size, a cell shape, a size and shape of nucleus, a fluorescent pattern, or a fluorescent color distribution.

In some embodiments in accordance with the present technology (example B4), a method for obtaining image based sorting of cells in a flow cytometry device includes recording an image; determining whether or not a cell is detected, and upon a determination that a cell is detected, processing the image; and based on the results of the processing, making a determination whether to trigger an actuator in the flow cytometry device.

Example B5 includes the method of example B4, in which upon a determination that a cell is not detected, resuming the recording of the image.

Example B6 includes the method of example B4, in which determining whether or not a cell is detected includes calculating a brightness value, upon a determination that the brightness value exceed a first threshold, determining a derivative value, and upon a determination that the derivative value exceed a second threshold, providing an indication that a cell is detected.

Example B7 includes the method of example B4, which is implemented in one of an FPGA or a DSP.

Example B8 includes the system of example B1, in which the real-time cell image processing and sorting control electronic system is implemented in an FPGA.

In some embodiments in accordance with the present technology (example C1), an image-based particle sorting system includes a particle flow device structured to include a substrate, a channel formed on the substrate operable to flow cells along a flow direction to a first region of the channel, and two or more output paths branching from the channel at a second region proximate to the first region in the channel; an imaging system interfaced with the particle flow device and operable to obtain image data associated with a cell when the cell is in the first region during flow through the channel; a data processing and control unit in communication with the imaging system, the data processing and control unit including a processor configured to process the image data obtained by the imaging system to determine one or more properties associated with the cell from the processed image data and to produce a control command based on a comparison of the determined one or more properties with a sorting criteria, in which the control command is produced during the cell flowing in the channel and is indicative of a sorting decision determined based on one or more cellular attributes ascertained from the image signal data that corresponds to the cell; and an actuator operatively coupled to the particle flow device and in communication with the actuator, the actuator operable to direct the cell into an output path of the two or more output paths based on to the control command, in which the system is operable to sort each of the cells during flow in the channel within a time frame of 15 ms or less from a first time of image capture by the imaging system to a second time of particle direction by the actuator.

Example C2 includes the system of example C1, in which the particle flow device includes a microfluidic device or a flow cell integrated with the actuator on the substrate of the microfluidic device or the flow cell.

Example C3 includes the system of example C1, in which the actuator includes a piezoelectric actuator coupled to the substrate and operable to produce a deflection to cause the cell to move in a direction in the second region that directs the cell along a trajectory to the output path of the two or more output paths.

Example C4 includes the system of example C1, in which the imaging system includes one or more light sources to provide an input light at the first region of the particle flow device, and an optical imager to capture the image data from the cells illuminated by the input light in the first region.

Example C5 includes the system of example C4, in which the one or more light sources include at least one of a laser or a light emitting diode (LED).

Example C6 includes the system of example C4, in which the optical imager includes an objective lens of a microscope optically coupled to a spatial filter, an emission filter, and a photomultiplier tube.

Example C7 includes the system of example C6, in which the optical imager further includes one or more light guide elements to direct the input light at the first region, to direct light emitted or scattered by the cell to an optical element of the optical imager, or both.

Example C8 includes the system of example C7, in which the light guide element includes a dichroic mirror.

Example C9 includes the system of example C6, in which the optical imager includes two or more photomultiplier tubes to generate two or more corresponding signals based on two or more bands or types of light emitted or scattered by the cell.

Example C10 includes the system of example C1, in which the processor of the data processing and control unit includes a field-programmable gate-array (FPGA), a graphics processing unit (GPU), or a FPGA and a GPU in parallel.

Example C11 includes the system of example C1, in which the data processing and control unit is configured to receive the image data including time domain signal data associated with the cell imaged in the first region on the particle flow device, process the image data to produce an image data set representative of an image of the cell, analyze the produced image data set to extract one or more parameters from the image data set associated with the one or more properties associated with the cell, and determine the control command based on the comparison of the extracted one or more parameters with one or more thresholds of the sorting criteria.

Example C12 includes the system of example C11, in which the data processing and control unit is configured to process the image data to produce the image data set by filtering the image data, reconstructing a first image based on the filtered data, and resizing the reconstructed first image to produce a second image, in which the second image includes binary image data.

Example C13 includes the system of example C1, in which the one or more properties associated with the cell includes one or more of an amount or a size of a feature of or on the cell, one or more particles attached to the cell, or a particular morphology of the cell or portion of the cell.

Example C14 includes the system of example C1, in which the sorting criteria includes a cell contour, a cell size, a cell shape, a nucleus size, a nucleus shape, a fluorescent pattern, or a fluorescent color distribution.

Example C15 includes the system of example C1, in which the one or more properties associated with the cell includes a physiological property of the cell including a cell life cycle phase, an expression or localization of a protein by the cell, an expression or localization of a gene by the cell, a damage to the cell, or an engulfment of a substance or a particle by the cell.

Example C16 includes the system of example C15, in which the determined damage to the cell includes DNA damage.

In some embodiments in accordance with the present technology (example C17), a method for image-based particle sorting includes obtaining image signal data of a cell flowing through a channel of a particle flow device; processing the image signal data to produce an image data set representative of an image of the cell; analyzing the produced image data set to identify one or more properties of the cell from the processed image data; evaluating the one or more identified properties of the cell with a sorting criteria to produce a control command to sort the cell based on one or more cellular attributes ascertained from the image signal data corresponding to the cell during cell flow in the particle flow device; and directing the cell into one of a plurality of output paths of the particle flow device based on to the control command.

Example C18 includes the method of example C17, in which the obtaining, the processing, the analyzing, the producing and the directing operations are performed during the cell flowing in the channel within a time frame of 15 ms or less.

Example C19 includes the method of example C17, in which the producing the control command includes extracting one or more parameters from the processed image data of the cell associated with the identified one or more properties of the cell, and comparing the extracted one or more parameters from the image with one or more threshold values of the sorting criteria.

Example C20 includes the method of example C17, in which the processing the image signal data to produce the image data set includes filtering the image signal data; reconstructing a first image based on the filtered data; and resizing the reconstructed first image to produce a second image, in which the second image includes binary image data.

Example C21 includes the method of example C17, in which the processing the image signal data includes detecting the presence of the cell prior to producing the image data set representative of the image of the cell.

Example C22 includes the method of example C21, in which the detecting the presence of the cell includes calculating a brightness value associated with a magnitude of signal intensity of the image signal data; evaluating that the brightness value with a first threshold; determining a derivative value when the brightness value exceeds the first threshold; evaluating that the derivative value exceeds a second threshold; and determining that the derivative value exceeds the second threshold.

Example C23 includes the method of example C17, in which the one or more properties associated with the cell includes one or more of an amount or a size of a features of or on the cell, one or more particles attached to the cell, or a particular morphology of the cell or portion of the cell.

Example C24 includes the method of example C17, in which the sorting criteria includes a cell contour, a cell size, a cell shape, a nucleus size, a nucleus shape, a fluorescent pattern, or a fluorescent color distribution.

Example C25 includes the method of example C17, in which the one or more properties associated with the cell includes a physiological property of the cell including a cell life cycle phase, an expression or localization of a protein by the cell, an expression or localization of a gene by the cell, a damage to the cell, or an engulfment of a substance or a particle by the cell.

Example C26 includes the method of example C25, in which the determined damage to the cell includes DNA damage.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and nonremovable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

Only a few implementations and examples are described and other implementations, enhancements and variations can be made based on what is described and illustrated in this patent document.

What is claimed is:

1. An image-based particle sorting system, comprising:
   a particle flow device structured to include a substrate comprising a channel, the particle flow device operable to flow cells along a flow direction to a first region of the channel, and two or more output paths branching from the channel at a second region proximate to the first region in the channel;
   an imaging system configured to obtain optical signal data associated with a cell when the cell is in the first region;
   a data processing and control unit comprising a processor, the data processing and control unit in communication with the imaging system and configured to (i) process the optical signal data into a two-dimensional image of the cell, (ii) extract one or more parameters from the two-dimensional image of the cell, wherein the one or more parameters include one or more spatial features of the cell, and (iii) produce a control command for sorting the cell based on the one or more parameters from the two-dimensional image of the cell, wherein the control command is produced while the cell flows in the channel;
   a spatial filter, the spatial filter comprising a plurality of slits, and wherein a resolution of the two-dimensional image of the cell is diffraction limited in the flow direction with respect to a length of one or more slits of the plurality of slits in the flow direction; and
   an actuator operatively coupled to the particle flow device and in communication with the data processing and control unit, the actuator operable to direct the cell into an output path of the two or more output paths based on the control command.

2. The system of claim 1, wherein the particle flow device is configured to flow the cell at a speed of no less than 0.08 m/s.

3. The system of claim 1, wherein the imaging system includes one or more light sources to provide an input light to the cell at the first region of the particle flow device, and an optical imager configured to receive optical image data from the cells in the first region.

4. The system of claim 3, wherein the optical imager is configured to obtain the optical signal data at a sampling rate of no less than 200 kHz.

5. The system of claim 1, wherein the optical signal data comprises a first optical signal and a second optical signal, the first optical signal comprising a first fluorescent signal, and the second optical signal comprising a second fluorescent signal.

6. The system of claim 1, wherein the optical signal data comprises a first optical signal and a second optical signal, the first optical signal comprising a first fluorescent signal, and the second optical signal comprises a visible light signal.

7. The system of claim 1, wherein the data processing and control unit is configured to process the image data to produce the image data set by filtering the image data, reconstructing a first image based on the filtered data, and resizing the reconstructed first image to produce a second image, wherein the second image includes binary image data.

8. The system of claim 7, wherein the control command is based on one or more parameters extracted from an overlay of the first and second images.

9. The system of claim 1, wherein the one or more parameters from the two-dimensional image of the cell includes one or more of an amount or a size of a feature of or on the cell, one or more particles attached to the cell, or a particular morphology of the cell or portion of the cell.

10. The system of claim 1, wherein the one or more parameters from the two-dimensional image of the cell comprise fluorescence area, bright field area, fluorescence perimeter, or bright field perimeter.

11. The system of claim 1, wherein the control command for sorting the cell includes a sorting criteria, and wherein the sorting criteria includes a cell contour, a cell size, a cell shape, a nucleus size, a nucleus shape, a fluorescent pattern, or a fluorescent color distribution.

12. The system of claim 1, wherein the one or more parameters from the two-dimensional image of the cell includes a physiological property of the cell including a cell life cycle phase, an expression or localization of a protein by the cell, an expression or localization of a gene by the cell, a damage to the cell, or an engulfment of a substance or a particle by the cell.

13. The system of claim 12, wherein the damage to the cell includes DNA damage.

14. A method for image-based particle sorting, comprising:
   obtaining optical signal data of a cell flowing through a channel of a particle flow device wherein the particle flow device comprises a spatial filter, the spatial filter comprising a plurality of slits;
   processing the optical signal data into a two-dimensional image of the cell, wherein a resolution of the two-dimensional image of the cell is diffraction limited in a flow direction with respect to a length of one or more slits of the plurality of slits in the flow direction;
   extracting one or more parameters from the two-dimensional image of the cell, the one or more parameters comprising a spatial distribution of one or more features of the cell;
   producing a control command to sort the cell based on the one or more parameters from the two-dimensional image of the cell; and
   directing the cell into one of a plurality of output paths of the particle flow device based on the control command.

15. The method of claim 14, further comprising flowing the cell through the channel at a speed of no less than 0.08 m/s.

16. The method of claim 14, wherein the optical signal data is obtained at a sampling rate of no less than 200 kHz.

17. The method of claim 14, wherein producing the control command includes comparing the extracted one or more parameters from the two-dimensional image of the cell with one or more threshold values of a sorting criteria.

18. The method of claim 14, wherein the optical signal data comprises time domain signal data, and wherein processing the optical signal data comprises converting the time domain signal data into a binary image of the cell.

\* \* \* \* \*